United States Patent [19]
Hasegawa et al.

[11] Patent Number: 5,878,029
[45] Date of Patent: Mar. 2, 1999

[54] VARIABLE-BANDWIDTH NETWORK

[75] Inventors: Haruhisa Hasegawa, Higashiyamato; Naoaki Yamanaka, Kokubunnji; Kouhei Shiomoto, Iruma, all of Japan

[73] Assignee: Nippon Telegraph and Telephone Corporation, Tokyo, Japan

[21] Appl. No.: 799,412

[22] Filed: Feb. 12, 1997

Related U.S. Application Data

[63] Continuation of PCT/JP96/01826 Jul. 1996.

[30] Foreign Application Priority Data

| Jul. 3, 1995 | [JP] | Japan | 7-167585 |
|---|---|---|---|
| Jul. 3, 1995 | [JP] | Japan | 7-167616 |
| Jul. 21, 1995 | [JP] | Japan | 7-185930 |
| Jul. 25, 1995 | [JP] | Japan | 7-189459 |
| Oct. 27, 1995 | [JP] | Japan | 7-280893 |
| Nov. 21, 1995 | [JP] | Japan | 7-302882 |

[51] Int. Cl.$^6$ .................................................. H04L 12/56
[52] U.S. Cl. ........................... 370/236; 370/252; 370/468
[58] Field of Search ..................................... 370/230, 235, 370/236, 252, 253, 465, 468, 477

[56] References Cited

U.S. PATENT DOCUMENTS

| 5,515,359 | 5/1996 | Zheng | 370/236 |
|---|---|---|---|
| 5,546,377 | 8/1996 | Ozveren | 370/253 |
| 5,633,859 | 5/1997 | Jain et al. | 370/236 |
| 5,649,110 | 7/1997 | Ben-Nun et al. | 395/200.19 |
| 5,675,576 | 10/1997 | Kalampoukas et al. | 370/236 |
| 5,677,906 | 10/1997 | Hayter et al. | 370/235 |
| 5,694,390 | 12/1997 | Yamato et al. | 370/236 |

FOREIGN PATENT DOCUMENTS

| 5-14410 | 1/1993 | Japan . |
|---|---|---|
| 5-183579 | 7/1993 | Japan . |
| 5-268240 | 10/1993 | Japan . |
| 6-97952 | 4/1994 | Japan . |
| 7-221763 | 8/1995 | Japan . |
| 7-231322 | 8/1995 | Japan . |

OTHER PUBLICATIONS

B-607 Network resource management method based on ALPEN for multiple service classes, Kohei Shiomoto et al (See ISR).

Technical Report of IEICE, SSE95-105,CPSY95-75 (1995-10) ABR ER-mode on ATM Multi-protocol emulation Network:ALPEN,H.Hasegawa et al, pp. 61-66 (See ISR).

(List continued on next page.)

*Primary Examiner*—Min Jung
*Attorney, Agent, or Firm*—Pillsbury Madison & Sutro LLP

[57] ABSTRACT

When bandwidth in an ATM network is controlled so as to increase in accordance with a user request, there is a considerable delay from the occurrence of the request until the bandwidth is actually changed; and there is therefore a need to control the traffic flowing in ATM network transmission paths faster and more flexibly. There is also a need to decrease the probability of overbooking occurring when deciding whether or not to accept a bandwidth change request. Route information that includes information relating to residual bandwidth is therefore collected in advance by subscriber switches that serve terminals. In response to a request from a user, a subscriber switch alone replies rapidly. During this process, the fact that there are a plurality of bandwidth change requests within the same residual bandwidth measurement period, is considered and a portion of the measured residual bandwidth is held for other bandwidth change requests. This enables the delay to be shortened. In addition, it is sufficient if the functions corresponding to the plurality of protocols employed by users are provided at and only at the subscriber switches which directly serve those users, whereby the hardware configuration of the transit switches etc. can be simplified. In addition, bandwidth can be allocated with high precision.

25 Claims, 40 Drawing Sheets

OTHER PUBLICATIONS

B–345 ATM Multi–Protocol Emulation Network (ALPEN) N.Yamanaka et al (See ISR & Appln. p. 4).
B–346 A CAC method in ATM Multi–Protocol Emulation Network (ALPEN), K.Shiomoto et al (SEE ISR).

B–347 ABR Emulation by ATM Multi–protocol Emulation Network (ALPEN),H. Hasegawa et al (See ISR).

IEICE Trans.Commun., vol. E79–B, No. 4 Apr. 1996 ALPEN: A Simple and Flexible ATM Network Based on Multi Protocol Emulation at Edge Nodes,N.

| | | 24 | | |
|---|---|---|---|---|
| Destination A | Route 1 | Residual Bandwidth 1 | Current Bandwidth 1 | Hop Number 1 |
| Destination A | Route 2 | Residual Bandwidth 2 | Current Bandwidth 2 | Hop Number 2 |
| Destination A | Route 3 | Residual Bandwidth 3 | Current Bandwidth 3 | Hop Number 3 |
| | | ⋮ | | |

Fig.30

| FIELDS | LENGTH | NAME |
|---|---|---|
| Header | 1 – 5 | ATM Header |
| ID | 6 | Protocol Identifier |
| DIR | 7 | Direction Identifier |
| BN | 7 | Backward Congestion Notification |
| CI | 7 | Congestion Indication |
| NI | 7 | No – Increase Bit : Prohibits Increase of Allowed Cell Rate |
| RA | 7 | Request/Acknowledgement |
| ER | 8 – 9 | Explicit Rate |
| CCR | 10 – 11 | Current allowed Cell Rate |
| MCR | 12 – 13 | Minimum Cell Rate |
| QL | 14 – 17 | Queue Length |
| SN | 18 – 21 | Sequential Number |
| Reserved | 22 – 51 | Reserved |
| Reserved | 52 | Other |
| Other | 52 – 53 | Other |

Prior Art

Fig.47

VARIABLE-BANDWIDTH NETWORK

This application is a continuation of PCT/JP96/01826 filed Jul. 2, 1996.

TECHNICAL FIELD OF THE INVENTION

This invention is utilized in asynchronous transfer mode (hereinafter, "ATM") networks, and in the control of virtual path (hereinafter, "VP") bandwidth. It is utilized in dynamic bandwidth varying networks in which the bandwidths of the connections that connect subscribers can be varied. It relates in particular to a technique for shortening the time from a bandwidth change request occurring to the bandwidth actually being changed.

In this specification, "VP" signifies a virtual transmission path that is set in a physical transmission path between adjacent transit switches or subscriber switches in a network, and "route" signifies a transmission path that is set between one subscriber switch and another subscriber switch via a plurality of VPs.

DESCRIPTION OF RELATED ART

There are various transfer services between terminals in an ATM network. In addition to conventional constant bit rate service and variable bit rate service, a new service that is attracting attention is available bit rate (ABR) service. With an ABR service, each user can control his own cell output rate on the basis of the ABR protocol, decreasing the cell rate when the network is congested and increasing it when the network has spare capacity. ABR techniques are in process of being standardized by the ATM Forum and the ITU-TS (Telecommunications Standardization Sector).

FIG. 46 is a block diagram of a prior art variable-bandwidth network constituting an ATM network offering an ABR service. In this example, two subscriber switches 20 and 30 are connected via transmission link $7_1$, transit switch $4_1$, transmission link $7_2$, transit switch $4_2$, and transmission link $7_3$. Terminal $3_1$ is served by subscriber switch 20 and terminal 32 is served by subscriber switch 30. Subscriber switches 20 and 30 and transit switches $4_1$ and $4_2$ perform switching and connection of virtual channels (hereinafter, "VCs") which are logical channels. They may therefore be called "virtual channel handlers".

When it is desired to transfer information, e.g. to carry out file transfer, terminal $3_1$ may request a change in bandwidth by sending resource management cells (hereinafter, "RM cells") to the network. The contents of the RM cells (in this example, a 10 Mb/s information stream) are read in subscriber switch 20, transit switches $4_1$ and $4_2$ and subscriber switch 30, and the cell output rate of terminal $3_1$ is ascertained. When there is a risk of congestion, a congestion notification or an indication of a lower cell rate is written to the RM cell, which is then transferred to the next switch. Another field in the ATM header called the payload-type identifier (PTI) is used in addition to the virtual path identifier (hereinafter, "VPI") and the virtual channel identifier (hereinafter, "VCI") that are used by terminal $3_1$ which has sent the RM cell, and this PTI enables the RM cell to be transferred automatically through the route assigned to terminal $3_1$.

FIG. 47 shows the configuration of an RM cell. This RM cell comprises the following information: the ATM header, a protocol identifier (ID), a direction identifier (DIR), a backward congestion notification (BN), a congestion indication (CI), a no-increase bit (NI) for prohibiting increase in the allowed cell rate, a request/acknowledgement (RA), the explicit rate (ER), the current allowed cell rate (CCR), the minimum cell rate (MCR), the queue length (QL), and the sequential number (SN). The CI bit for congestion notification is provided so that the network can notify a terminal of whether there is congestion, with "0" signifying no congestion and "1" signifying that there is congestion. The ER field, which shows the explicit cell rate, is provided for the purpose of entering an allowable cell rate at each element constituting the network.

An RM cell that has been output from terminal $3_1$ shown in FIG. 46 is sent to terminal $3_2$ by way of subscriber switch 20, transit switches $4_1$ and $4_2$, and subscriber switch 30. During this process, if the allowable cell rate of subscriber switch 20 or 30, or of transit switch $4_1$ or $4_2$, is smaller than the value of the ER field of the RM cell that has arrived at the switch in question, the value of the ER field is rewritten by the switch, being set to an allowable cell rate below the peak cell rate. When there is congestion, a switch sets the CI bit of the RM cell to "1". When the RM cell relayed in this way arrives at terminal $3_2$, the terminal sends the RM cell back towards terminal $3_1$. When terminal $3_1$ receives the RM cell, it increases the allowed cell rate only when the Cl bit of the arrived RM cell is "0". If the CI bit is "1", the terminal conversely decreases the allowed cell rate, with the cell rate being set to whichever of the ER field value and the newly-calculated allowed cell rate is the smaller. Terminal $3_1$ then begins outputting cells at a cell rate that has been set in this way. Thereafter, terminal $3_1$ outputs an RM cell every N cells, and continues to change the cell rate adaptively by means of the same sort of procedure.

The operation of a source-side terminal as it relates to RM cells is shown in FIG. 48 and FIG. 49. The operation of a switch as it relates to RM cells is shown in FIG. 50, and the operation of a destination-side terminal as it relates to RM cells is shown in FIG. 51. As shown in FIG. 48, a source-side terminal generates an RM cell (S81), sets the congestion indication (CI) to "0" (i.e. to "no congestion") and the explicit cell rate (ER) to the peak cell rate (PCR) (S82), and outputs the RM cell (S83). As shown in FIG. 49, a source-side terminal which receives an RM cell (S91) increases the allowed cell rate (ACR) (S93) if the congestion indication (CI) is "0", i.e. if it is set to "no congestion" (S92). On the other hand, if the congestion indication (CI) is "1", i.e. if it is set to "there is congestion" (S92), the source-side terminal decreases the allowed cell rate (ACR) (S94). The cell rate of whichever of the allowed cell rate (ACR) and the explicit rate (ER) is the smaller is set as the cell output rate (S95). As shown in FIG. 50, when a switch receives an RM cell (S101), it writes the allowable rate for that terminal as the explicit rate (ER) (S102) and if there is congestion (S103), sets the congestion indication (CI) to "1" (S105) and outputs the RM cell (S104). As shown in FIG. 51, when a destination-side terminal receives an RM cell (S201), it writes the allowable rate for that terminal as the explicit rate (ER) (S202) and if there is congestion (S203), sets the congestion indication (CI) to "1" (S205). It then returns the RM cell (S204).

FIG. 52 is a timing chart of the RM cell handling at the various switches. Because information relating to the residual bandwidth etc. of the resources has to be accessed at each of the switches, i.e. at subscriber switches 20 and 30 and transit switches $4_1$ and $4_2$, a certain amount of time is required at each switch for the transfer of an RM cell.

FIG. 53 shows an example of the temporal response to a request from a terminal. When there is a request to increase bandwidth, time (the response time) is taken to check the residual bandwidth at each transit switch. This constitutes a delay before the request can be fulfilled, and detracts from the service provided. Because an actual network involves distance and has a large number of transit switch stages, response time becomes particularly problematic. Furthermore, if a response takes an appreciable time, then the acquired congestion information becomes outdated during this interval. As a result, a satisfactory control effect cannot be obtained because bandwidth allocation control is being performed on the basis of information which is at odds with the actual congestion.

To solve this problem, it is proposed that a subscriber switch should use RM cells or operations and maintenance cells (hereinafter, "OAM" cells) to periodically collect information relating to the residual bandwidth of routes. Then, when there is a bandwidth change request from a subscriber, the subscriber switch serving that subscriber can immediately decide for or against the bandwidth change (see "ATM Multi-Protocol Emulation Network: ALPEN", Shutten, Conference of the Communication Society of the IEICE Japan, 1995, B-345). A prior art example of this is shown in FIG. 54.

FIG. 54 is a block diagram showing a prior art variable-bandwidth network. This variable-bandwidth network has a plurality of switches 40–45 and constitutes an ATM network. It is assumed here that switches 40 and 41 are subscriber switches, each connecting subscribers to the network, and that route a is set from switch 40 via switches 42, 43 and 44, and that route b is set from switch 41 via switches 42, 43 and 45. It is further assumed that each of links 70, 71, 73 and 74 between switches 40 and 42, 41 and 42, 43 and 44, and 43 and 45 has a capacity of 20 Mb/s, while link 72 between switches 42 and 43 has a capacity of 30 Mb/s. It is further assumed that routes a and b are each using 10 Mb/s of bandwidth. Links 70–74 therefore respectively use 10, 10, 20, 10 and 10 Mb/s of their bandwidth, which means that 10 Mb/s of residual bandwidth is left for both route a and route b.

Switches 40–45 are respectively provided with bandwidth controllers 50–55 which control bandwidth change and the transfer of RM cells, and with route tables 60–65 which store information relating to the residual bandwidth of the various routes. The stored contents of route tables 60–65 are updated by bandwidth controllers 50–55 referring to the RM cells or OAM cells which give notification of residual bandwidth and which are transmitted periodically in each route. When there have been bandwidth increase requests from subscribers served by subscriber switches 40 and 41, for example by means of bandwidth-indicating RM cells, bandwidth controllers 50 and 51 of those switches 40 and 41 can immediately decide for or against an increase by referring to route tables 60 and 61.

However, if RM cells or OAM cells are periodically used by subscriber switches to collect information relating to the residual bandwidth of routes, so that a decision for or against a bandwidth change is made immediately when there is a bandwidth change request from a user, the following situation can arise. Namely, because the information relating to the residual bandwidth of routes is updated periodically, if a plurality of bandwidth change requests have occurred in the same period, there will be competition for the links of those routes, and there is a probability that an over-capacity bandwidth will be granted. Hereinafter, this phenomenon will be called "overbooking". In the example shown in FIG. 54, if bandwidth increase requests have occurred simultaneously for both route a and route b, switches 40 and 41 end up accepting the requested increases in bandwidth, thereby giving rise to overbooking, with the capacity of link 72 being insufficient. In the event of such overbooking of bandwidth, congestion with attendant cell loss occurs, and therefore the probability of overbooking has to be made as small as possible.

SUMMARY OF THE INVENTION

The object of the present invention is to provide a variable-bandwidth network capable of allocating bandwidth rapidly and in real time. It is a further object of this invention to provide a variable-bandwidth network capable of allocating bandwidth with high precision. It is a further object of this invention to provide a variable-bandwidth network which has flexibility. It is a further object of this invention to provide a variable-bandwidth network which can simplify the hardware configuration of an ATM switch. It is a further object of this invention to provide a variable-bandwidth network which has a low cell loss ratio and a high throughput. It is a further object of this invention to provide a variable-bandwidth network wherein there is only a small probability that overbooking occurs when a subscriber switch decides whether or not to accept bandwidth change requests. It is a further object of this invention to provide a variable-bandwidth network which can instantly find the optimum route from a plurality of routes. It is a further object of this invention to provide a variable-bandwidth network capable of using bandwidth efficiently.

One feature of this invention is that information that includes the residual bandwidth of a route through which a given connection passes is obtained at a subscriber switch in advance, when there is no bandwidth change request. Another feature of this invention is that when a user requests a bandwidth change etc., this request is accepted or rejected by a protocol controller in the switch which serves the subscriber, and other protocols are also controlled in a unified way by the controller. Consequently, the time from when a user requests a change of bandwidth until permission for the change is granted only has to be the time taken for an exchange between the terminal and the subscriber switch that serves it. As a result, bandwidth can be changed rapidly. It is sufficient if functions corresponding to the protocols used by the terminal are provided only in the subscriber switch directly serving that terminal, and there is no need to provide the transit switches and other ATM switches with functions that correspond to a plurality of different types of protocol.

This invention is an ATM network comprising a plurality of subscriber switches, a plurality of physical transmission paths that connect these plurality of subscriber switches with each other, and transit switches interposed among these plurality of physical transmission paths. The routes are set among the aforesaid plurality of subscriber switches, and the aforesaid subscriber switches have means which support the protocols by which users perform adaptive flow control between themselves and the network.

One feature of this invention is that a source-side subscriber switch comprises: means for collecting route information that includes information relating to the residual bandwidth of a route that has been set up to a destination-side subscriber switch; and means for performing the aforesaid flow control in accordance with this route information.

It is desirable for the aforesaid means which collects route information to be provided in a source-side subscriber switch, and to include means which sends, to each aforesaid route, cells for the purpose of collecting the route information of the route. It is also desirable for the aforesaid transit switches and subscriber switches to have means which, when these cells have arrived, loads route information into their data field and forwards the cells in accordance with the routing information recorded in their address field.

A destination-side subscriber switch and the aforesaid transit switches can also have means for addressing and sending cells to a source-side subscriber switch, the cells bearing route information relating to routes pertaining to these switches.

Because route information is collected in this way from the required places without the need for any action by the source-side subscriber switch, the load on the source-side subscriber switch can be lightened.

According to an alternative configuration, a centralized controller is provided in the network, and the aforesaid subscriber switches and transit switches have means for sending cells bearing the aforesaid route information, the cells being addressed to this centralized controller. This centralized controller comprises means for reading and collecting the route information from these cells that have arrived, and means for notifying the aforesaid subscriber switch of the contents of this collecting means.

The aforesaid sending means can also have means which, when congestion has occurred in a route pertaining to its subscriber switch or its transit switch, sends cells bearing route information that includes information relating to this congestion.

By thus sending cells bearing route information only when there is a change in circumstances, unnecessary transmission and reception of cells can be avoided.

According to an alternative configuration, an aforesaid subscriber switch includes a residual bandwidth table which stores information relating to the utilization of the aforesaid routes, and means which, when there has been a bandwidth change request from a terminal served by the subscriber switch, decides for or against the bandwidth change of that terminal by making a comparison with the residual bandwidth stored in the residual bandwidth table.

An aforesaid subscriber switch should include means which monitors the minimum residual bandwidth on routes through which its connections pass, by periodically transferring operations and maintenance cells to the other subscriber switches connected via the aforesaid routes.

A subscriber switch thus obtains the residual bandwidth of its connections in advance, at a point in time when there is no bandwidth change request, and when a terminal (i.e. a user) requests a bandwidth change, that request is accepted or rejected by the subscriber switch which serves that terminal. If the request is granted, the terminal outputs cells at the changed bandwidth. This differs from the prior art in that any spare bandwidth is discovered ahead of time by the subscriber switch.

The aforesaid means which decides for or against a bandwidth change can also be configured to take account of the fact that there are a plurality of bandwidth change requests in the same residual bandwidth measurement period, and to include means which reserves a portion of the residual bandwidth of each route measured by the measuring means, the portion being reserved for other bandwidth change requests.

Specifically, the residual bandwidth measured by the measuring means may be multiplied by a preset safety factor for that route and the result taken as the allocable residual bandwidth; or the residual bandwidth measured by the measuring means may be multiplied by a safety factor determined by the intervals at which bandwidth change requests for that route have occurred up to the present time, and the result taken as the allocable residual bandwidth; or the allocatable residual bandwidth may be obtained on the basis of the changes to date in the residual bandwidth measured by the measuring means. Alternatively, allocable the residual bandwidth may be obtained by using a low-pass filter to obtain the sum of (i) the value obtained by multiplying the cell receiving rate measured the previous time by the measuring means by a smoothing coefficient $\alpha$, and (ii) the value obtained by multiplying the newly-measured cell receiving rate by $1-\alpha$, and thereby calculating the utilized bandwidth, and then calculating the remaining bandwidth from this value.

Each switch on a route monitors the residual bandwidth and notifies the source-side subscriber switch. On the basis of the residual bandwidth notified from each switch on the route, the subscriber switch evaluates by how much the bandwidth can subsequently be increased in that route. However, because the residual bandwidth on a route is periodically updated, when a plurality of bandwidth change requests have occurred in the same period, there is a probability that overbooking will occur. Consequently, a subscriber switch must take into consideration the frequency of occurrence of bandwidth change requests when deciding whether or not to grant such a request. This invention therefore estimates the extent of the bandwidth change requests which there will be in the same period, and at each subscriber switch, instead of allowing all the residual bandwidth to be used, reserves residual bandwidth in a notified proportion. The reserved residual bandwidth is intended to cover bandwidth change requests. In this way, overbooking is prevented before it occurs.

An aforesaid subscriber switch can also be configured so as to comprise means for collecting and recording new route information relating to a plurality of routes that can be set between a source-side subscriber switch and another subscriber switch which constitutes the destination-side subscriber switch, irrespective of whether there is a connection request; and means which, when there is a connection request, selects a route for that user on the basis of this recorded route information.

Information that includes the residual bandwidth of a plurality of routes through which a given connection could pass is obtained by a subscriber switch in advance, at a time when there is no bandwidth change request for the purpose of setting up a new route. When a user requests route setup or bandwidth change, etc., the optimum route is determined by a protocol controller in the switch that serves the subscriber, and the request is granted or rejected. It is sufficient if functions corresponding to the protocols used by the terminal are provided only in the subscriber switch directly serving that terminal. These is no need to provide the transit switches and other ATM switches with the capability of responding in real time to complex protocols.

It is desirable for the aforesaid recording means to include means which sends to each route cells for the purpose of collecting route information; and for the aforesaid transit switches and subscriber switches to have means which, when these cells have arrived, loads route information into their data field and forwards the cells in accordance with the routing information recorded in their address field.

It is desirable for the aforesaid route information to be information relating to routes pertaining to the aforesaid transit switches and subscriber switches, and for the aforesaid forwarding means to forward the aforesaid cells after addressing them to the aforesaid source-side subscriber switch.

It is desirable for the aforesaid route selecting means to select, from among the aforesaid plurality of routes, and from among routes which have more residual bandwidth than the bandwidth requested by the user, the route with the least residual bandwidth or the route with the smallest residual bandwidth ratio.

Because the route with the least wasted residual bandwidth is selected, network resources are utilized efficiently.

Alternatively, it is desirable for the aforesaid means which selects a route to select, from among the aforesaid plurality of routes, and from among routes which have more residual bandwidth than the bandwidth requested by the user, the route with the largest utilized bandwidth or the largest utilized bandwidth ratio.

In other words, when a new VC is set in a route in which another VC has already been set, the new VC is set so that the bandwidth of that route is almost filled up by the setting of the new VC. Because this can get rid of routes with insufficient residual bandwidth for practical use, network resources can be utilized efficiently.

Another possible configuration is to provide a centralized controller, and for the aforesaid subscriber switches and transit switches to have means which outputs cells bearing the aforesaid route information and addressed to this centralized controller, and for the aforesaid centralized controller to comprise means which reads and collects route information from these cells when they have arrived, and means which notifies the aforesaid subscriber switches of the content collected by this reading and collecting means.

The aforesaid means which outputs cells can be configured to have means which, when congestion has occurred in a route pertaining to its transit switch or its subscriber switch, outputs cells bearing route information and containing information relating to that congestion.

A source-side subscriber switch can thus obtain congestion information for each route, and during route setup can exclude routes in which there is congestion.

Another possible configuration is for an aforesaid subscriber switch to have means which communicates congestion information to the terminals it serves, and for this communicating means to include means which independently forms cells into which are written requests for increased or decreased cell rate, the allowed cell rate, and congestion information, and which transmits these cells to the terminals served by its subscriber switch.

Thus, a decision is made for or against an increase in the allowed cell rate, and this decision is communicated to the transmitting-side users. This is accomplished on the basis of residual bandwidth information for the transmission path in question, which is obtained by a subscriber switch, and without exchanging RM cells between source and destination terminals. In addition, congestion information is communicated. This differs from the prior art in the following respects:

(1) it is not necessary to send and receive RM cells between source and destination terminals for each connection;
(2) it is not necessary at each transit switch to receive RM cells, to discover the congestion situation and the allowable cell rate for each connection, to write this information into the RM cells, and then to forward them;
(3) it is not necessary to return RM cells at destination-side terminals;
(4) because a subscriber switch independently forms RM cells and sends them to source-side terminals, without relying on the transmission of RM cells by the source-side terminals, rapid control of cell rate is possible.

In an alternative configuration, each of the aforesaid subscriber switches and transit switches comprises: a table in which is recorded information relating to the allocated bandwidth ($B_i$, where $i=1, \ldots, n$) of routes pertaining to that switch, or of partial paths comprising VPs on those routes; means for calculating the allocable bandwidth by referring to the table when there has been a setup request for a requested bandwidth ($R_i$) on a route (the $i^{th}$ route) pertaining to that switch, or on a partial path comprising a VP on that route; means for reserving the result of this calculation in the table; and means which sets this reserved value as the new allocated bandwidth of the route in question (the $i^{th}$ route) or of the partial path comprising a VP on that route.

Thus, by providing a mechanism whereby a switch calculates the allocated bandwidth; and by making a virtual allocation in accordance with the bandwidth requested by the source-side switch and written in a management packet, and in accordance with the residual bandwidth of a route or of a partial path comprising a VP on a route; and by providing a mechanism whereby the management packet is used to notify the source-side switch of the result of the allocation, the source-side switch of a route discovers in advance a safe allocated bandwidth for that route.

This differs from the prior art in respect of the following points. Namely, there is a mechanism for calculating the allocated bandwidth at a switch; a management packet is used to notify the source-side switch of the calculated allocated bandwidth; the source-side switch of a route obtains in advance information relating to the route bandwidth which can be used safely; there is a function for calculating the allocated bandwidth by averaging the ratio of allocated bandwidth to requested bandwidth; and there is a bandwidth allocation mechanism which satisfies the requested bandwidth as far as possible, without exceeding the allowable bandwidth.

Because virtual bandwidth allocation is thus carried out in advance at each switch, it is possible to avoid having insufficient bandwidth when an actual transmission takes place.

It is desirable for the aforesaid source-side subscriber switch to have: means which outputs a management packet already bearing the aforesaid requested bandwidth (R) to the route which it is desired to set up, or to the partial path comprising a VP on that route, the management packet is output prior to the use of that route or of the partial path comprising a VP on that route, and the outputting means recovers this management packet after it has passed through that route which it is desired to set up, or through the partial path comprising a VP on that route; and means which recognizes, from this recovered management packet, the new allocated bandwidth for that route which it is desired to set up or for the partial path comprising a VP on that route. When this management packet arrives at each of the aforesaid subscriber switches and transit switches, it is desirable to give the aforesaid requested bandwidth (R) which was loaded into this management packet at the source-side subscriber switch, to the aforesaid calculating means as the requested bandwidth ($R_i$) of the route in question (the $i^{th}$ route) or of a partial path comprising a VP on that route.

Because information relating to bandwidth after bandwidth allocation is thus carried in the management packet, it is possible to avoid the situation in which bandwidth information is duplicated.

It is desirable for each of the aforesaid subscriber switches and transit switches to have: means which compares the aforesaid requested bandwidth (R) carried in the management packet which has arrived, and the new allocated bandwidth that was calculated by the aforesaid calculating means, and which reserves the smaller of these in the aforesaid table of the switch; and means which forwards that management packet after substituting the new allocated bandwidth reserved in this table for the aforesaid requested bandwidth (R).

Because it is thus possible to avoid a situation in which the calculated allocated bandwidth exceeds the requested bandwidth, bandwidth can be used efficiently.

It is desirable for the aforesaid calculating means to comprise calculating means which averages the weighting of the allocated bandwidth relative to the requested bandwidth by minimizing the evaluation function:

$$F(B) = (1/n) \cdot {}_{i=1 \, to \, n} \Sigma [(Bi/Ri) - (1/n) \cdot {}_{i=1 \, to \, n} \Sigma (Bj/Rj)]^2$$

where Bi is the allocated bandwidth, Ri is the requested bandwidth (i=1, 2, ..., n), and n is the number of routes multiplexed in the output path.

It is desirable to update the new allocated bandwidth Bj as follows:

$$Bj \leftarrow Bj - \alpha j \cdot (n \cdot (Bj/Rj) - {}_{i=1 \, to \, n} \Sigma (Bi/Ri)) \cdot ((n-1)/Rj)$$

Because bandwidth can be allocated with great precision using the evaluation function, it is possible to utilize bandwidth efficiently.

As has been explained in the foregoing, this invention can be used to implement a flexible variable-bandwidth network capable of allocating bandwidth rapidly, in real time, and with a high degree of precision. It can be used to implement a high-throughput variable-bandwidth network in which the hardware configuration of the ATM switches is simplified and the cell loss ratio is reduced. It can also be used to implement a variable-bandwidth network in which there is only a small probability of overbooking occurring when a subscriber switch decides whether to admit a bandwidth change request. This invention can therefore find the optimum route instantly from a plurality of routes, and can utilize bandwidth efficiently.

BRIEF DESCRIPTION OF THE DRAWINGS

FIG. 30 shows the contents of a route performance table according to the first embodiment of this invention.

FIG. 47 shows the configuration of an RM cell.

DETAILED DESCRIPTION OF THE PREFERRED EMBODIMENTS

Figure 1:
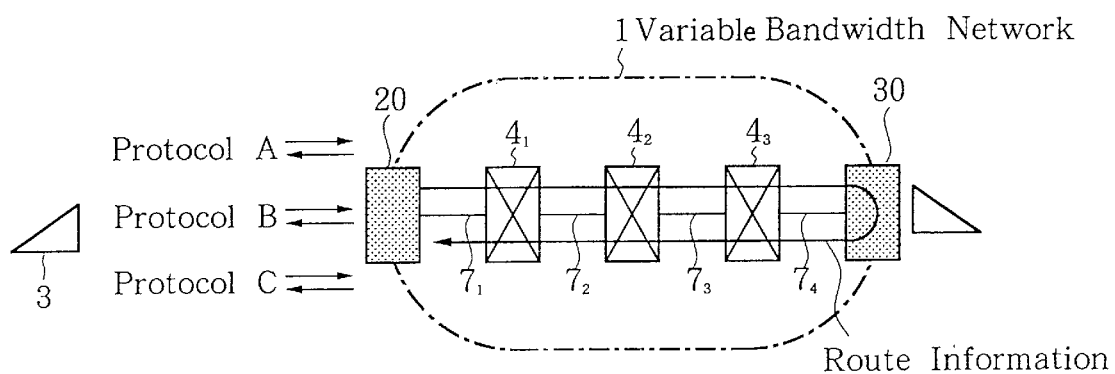
FIG. 1 is a conceptual diagram of a variable-bandwidth network according to this invention.
Figure 2:
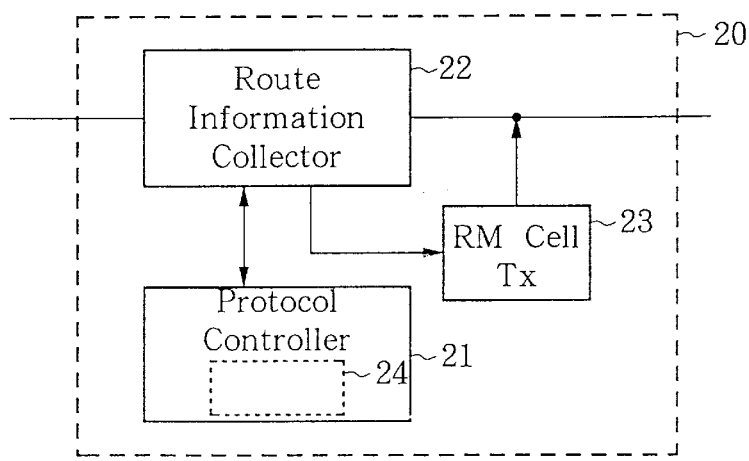
FIG. 2 is a block diagram of the essential parts of a source-side subscriber switch.
Figure 3:
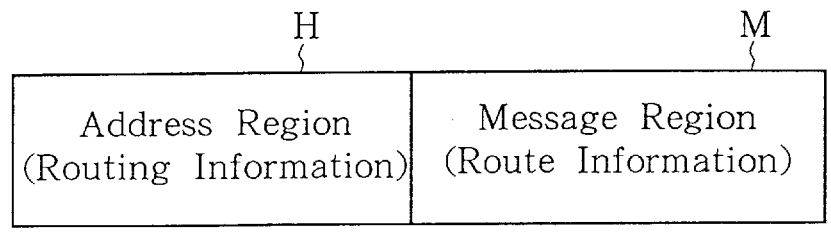
FIG. 3 is a conceptual diagram of an RM cell.
Figure 4:
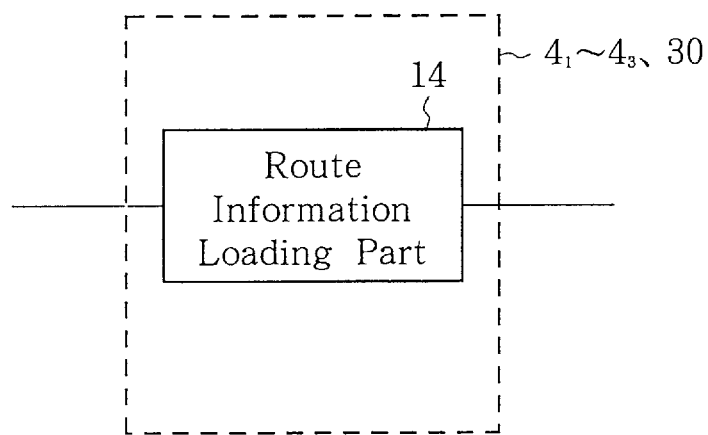
FIG. 4 is a block diagram of the essential parts of a transit switch and a destination-side subscriber switch.

A first embodiment of this invention will be explained with reference to FIG. 1–FIG. 4. FIG. 1 is a conceptual diagram of a variable-bandwidth network according to this invention. FIG. 2 is a block diagram of the essential parts of source-side subscriber switch 20. FIG. 3 is a conceptual diagram of an RM cell. FIG. 4 is a block diagram of the essential parts of transit switches $4_1$–$4_3$ and destination-side subscriber switch 30.

This invention is a variable-bandwidth network comprising: subscriber switches 20 and 30, transmission links $7_1$–$7_4$ which are physical transmission paths connecting these subscriber switches 20 and 30, and transit switches $4_1$–$4_3$ interposed between these transmission links $7_1$–$7_4$. In this network, routes are set between subscriber switches 20 and 30 and through transit switches $4_1$–$4_3$, and subscriber switch 20 or 30 has protocol controller 21, shown in FIG. 2, as means for supporting the protocols whereby terminal 3 performs adaptive flow control between itself and variable-bandwidth network 1.

One feature of this invention is that source-side subscriber switch 20 has: route information collector 22 as means for collecting route information that includes information relating to the residual bandwidth of a route that has been set between source-side subscriber switch 20 and destination-side subscriber switch 30, and protocol controller 21 as means for performing the aforesaid flow control in accordance with this route information. FIG. 3 is a conceptual diagram of an RM cell, which comprises an address field H and a message field M. Route information such as the bandwidth utilization ratio or the residual bandwidth, the cell loss ratio, etc. is loaded into the message field M each time an RM cell passes through a transit switch $4_1$–$4_3$ or subscriber switch 30. Routing information is written to address field H by subscriber switch 20.

Route information collector 22 is provided in source-side subscriber switch 20 and includes RM cell transmitter 23 as means for outputting RM cells for collecting the route information for each aforesaid route. As shown in FIG. 4, transit switches $4_1$–$4_3$ and destination-side subscriber switch 30 comprise route information loading part 14 as means which loads route information into the data field of an RM cell when it arrives, and which then outputs the RM cell in accordance with the routing information recorded in its address field.

As shown in FIG. 1, terminal 3 outputs cells to variable-bandwidth network 1 on the basis of various protocols relating to bandwidth change requests and so forth. The contents of these cells are determined immediately by subscriber switch 20 which serves the subscriber. Protocol controller 21 of subscriber switch 20 has route performance table 24 which manages information relating to the performance of routes through which relevant VCIs pass. Protocol controller 21 compares the contents of route performance table 24 with for example the bandwidth requested for a given VCI, and permits transfer, bandwidth change, and so forth.

Figure 5:
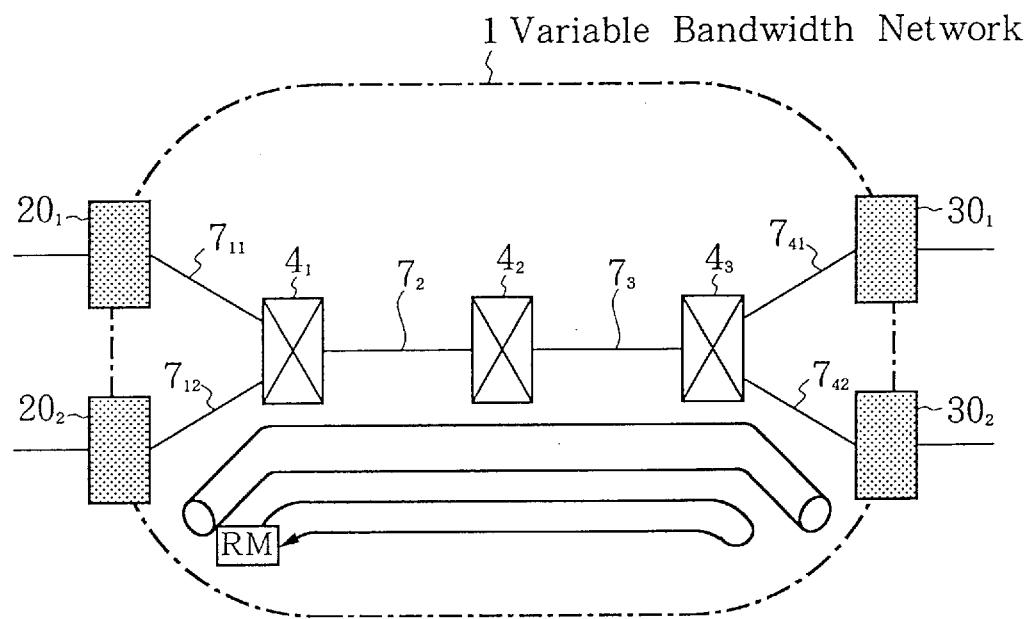
FIG. 5 shows how RM cells move through the network in a first embodiment of this invention.

FIG. 5 shows how RM cells circulate through the network in the first embodiment of this invention. This particular example shows how RM cells circulate between subscriber switches $20_2$ and $30_2$. Route information is collected by outputting RM cells from subscriber switch $20_2$ and returning them at subscriber switch $30_2$. It is also possible to estimate congestion from the round-trip time of the RM cells, without any processing whatsoever of RM cells at transit switches $4_1$=14 $4_3$ or subscriber switch $30_2$.

Figure 6:
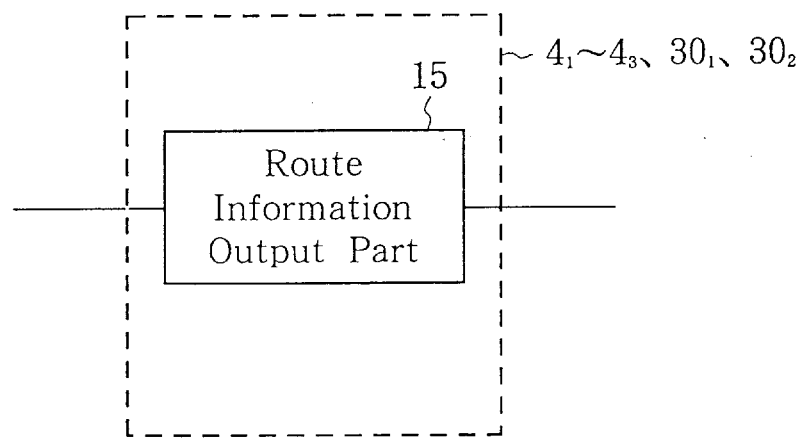
FIG. 6 is a block diagram of the essential parts of a transit switch and a destination-side subscriber switch in a second embodiment of this invention.
Figure 7:
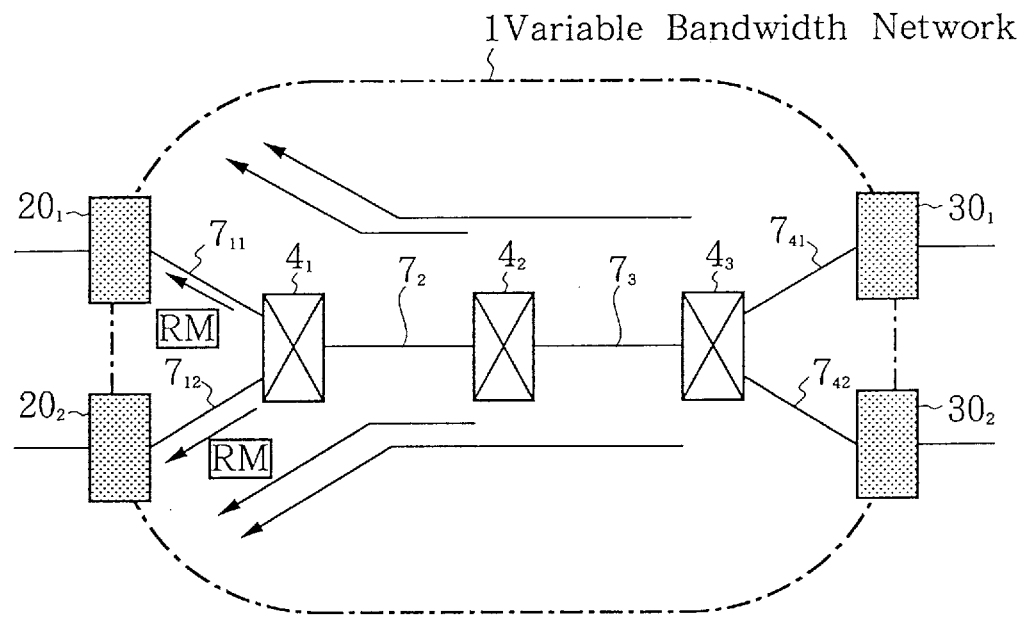
FIG. 7 shows how RM cells move through the network in a second embodiment of this invention.

A second embodiment of this invention will be explained with reference to FIG. 6 and FIG. 7. FIG. 6 is a block diagram of the essential parts of transit switches $4_1$–$4_3$ and subscriber switches $30_1$ and $30_2$ in this second embodiment. FIG. 7 shows how RM cells move through the network in this second embodiment. As shown in FIG. 6, subscriber switches $30_1$ and $30_2$ and transit switches $4_1$–$4_3$ have route information output part 15 as means for outputting RM cells addressed to subscriber switches $20_1$ and $20_2$, the RM cells carrying route information concerning VPs relevant to those switches.

In this second embodiment of the invention, transit switches $4_1$–$4_3$ and subscriber switches $30_1$ and $30_2$ each report route performance by using route information output part 15 to autonomously and periodically output RM cells to subscriber switches $20_1$ and $20_2$.

Figure 8:
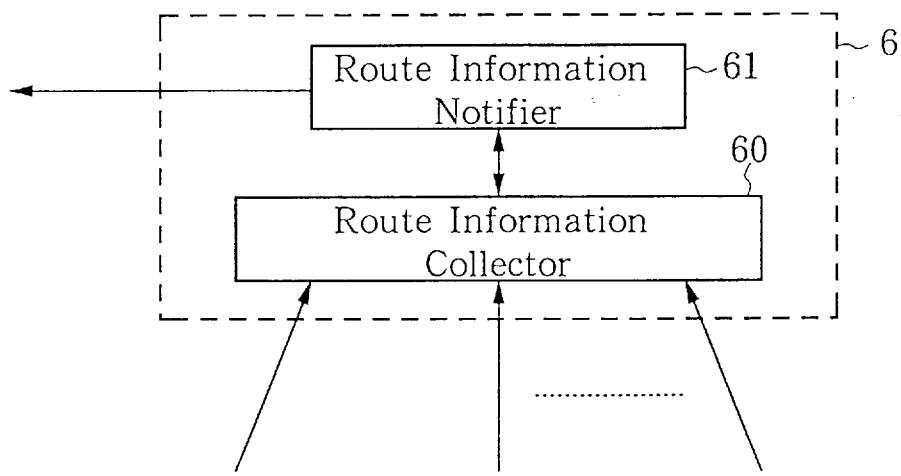
FIG. 8 is a block diagram of the essential parts of a centralized controller.
Figure 9:
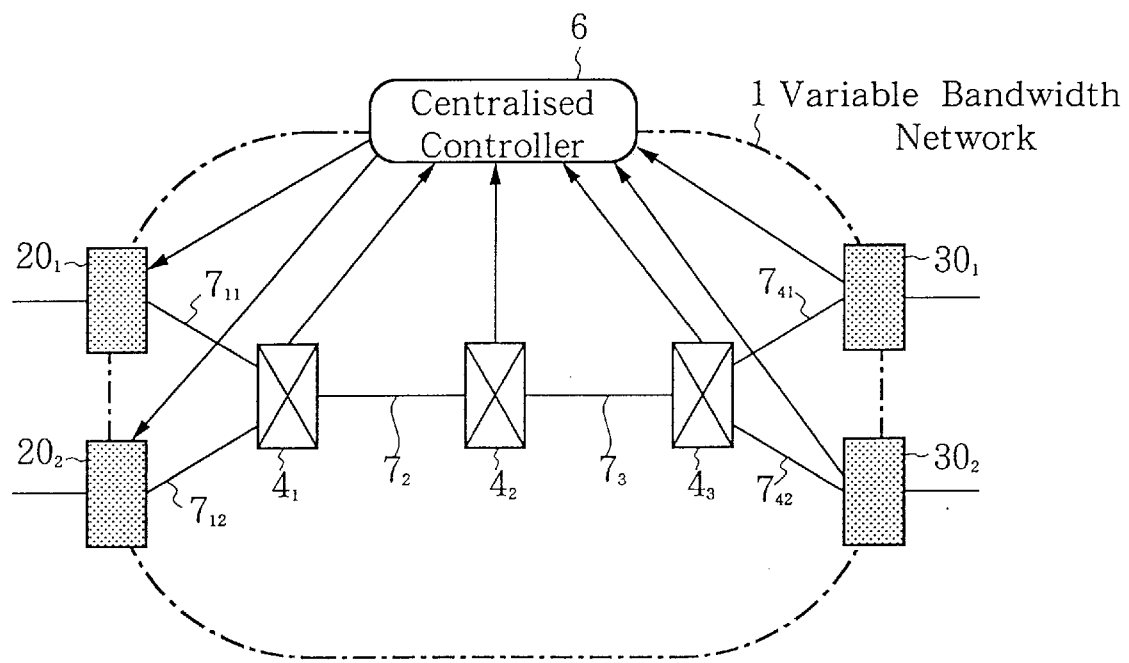
FIG. 9 shows the overall configuration of, and transfer of RM cells in, a third embodiment of this invention.

A third embodiment of this invention will be explained with reference to FIG. 8 and FIG. 9. FIG. 8 is a block diagram of the essential parts of a centralized controller. FIG. 9 shows the overall configuration of, and transfer of RM cells in, this third embodiment. According to this third embodiment of the invention, centralized controller 6 is provided within variable-bandwidth network 1; transit switches $4_1$–$4_3$ and subscriber switches $30_1$ and $30_2$ have route information output part 15 (the structure of which is shared with the route information output part shown in FIG. 6) as means for outputting cells carrying the aforesaid route information and addressed to this centralized controller 6; and centralized controller 6 comprises route information collector 60 as means for reading and collecting route information from these cells once they have arrived, and route information notifier 61 as means for notifying source-side subscriber switches $20_1$ and $20_2$ of the contents of this route information collector 60. The scheme adopted in this third embodiment of the invention is to obtain traffic conditions in variable-bandwidth network 1 at centralized controller 6 shown in FIG. 8, and to supply subscriber switches $20_1$ and $20_2$ with information relating to which nodes are congested, etc.

Centralized controller 6 has route information collector 60 which collects information from transit switches $4_1$–$4_3$ and subscriber switches $30_1$ and $30_2$. Route information is collected by receiving RM cells from said transit switches $4_1$–$4_3$ and subscriber switches $30_1$ and $30_2$. The route information obtained is written to message field M of RM cells over the existing route information, and these RM cells are then transferred to source-side subscriber switches $20_1$ and $20_2$.

Figure 10:
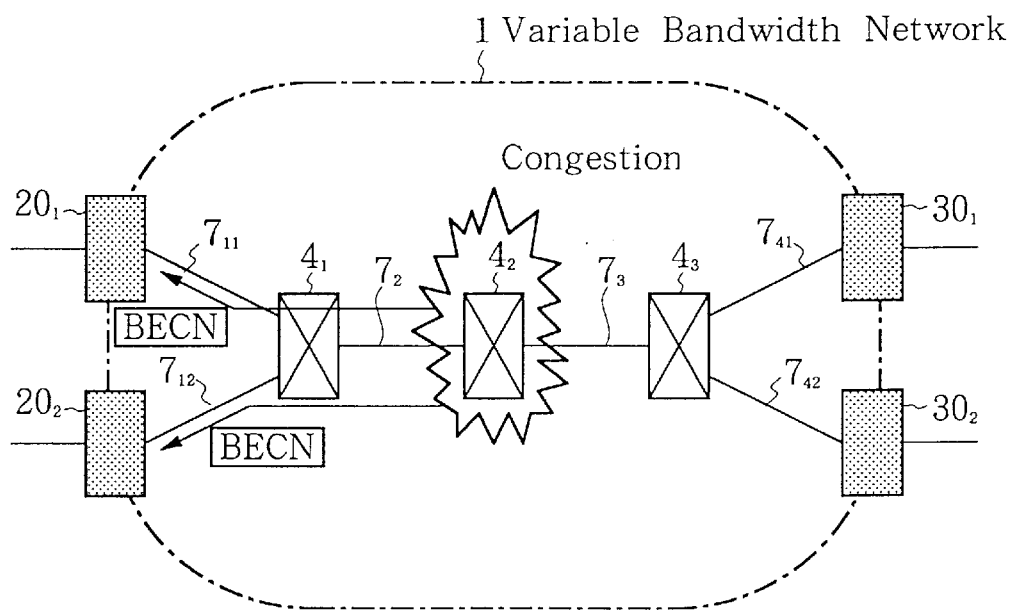
FIG. 10 shows a cell output situation in a fourth embodiment of this invention.

A fourth embodiment of this invention will be explained with reference to FIG. 10, which shows a cell output situation according to this fourth embodiment. In this fourth embodiment, backward explicit congestion notification (BECN) cells are sent from transit switches $4_1$–$4_3$ or destination-side subscriber switches $30_1$ and $30_2$ when there is congestion. Action can be taken by subscriber switches $20_1$ and $20_2$, on the basis of this information.

The timing of this action differs from the timing employed in the method of outputting RM cells periodically, which was disclosed in the second embodiment. However, the basic configuration of a BECN cell is the same as that of an RM cell, shown in FIG. 3.

In this fourth embodiment of the invention, route information output part 15 shown in FIG. 6 has means which, when congestion has occurred in a VP pertaining to its transit switch $4_1$–$4_3$ or destination-side subscriber switch $30_1$ and $30_2$, outputs BECN cells carrying route information that includes information relating to this congestion.

Figure 11:
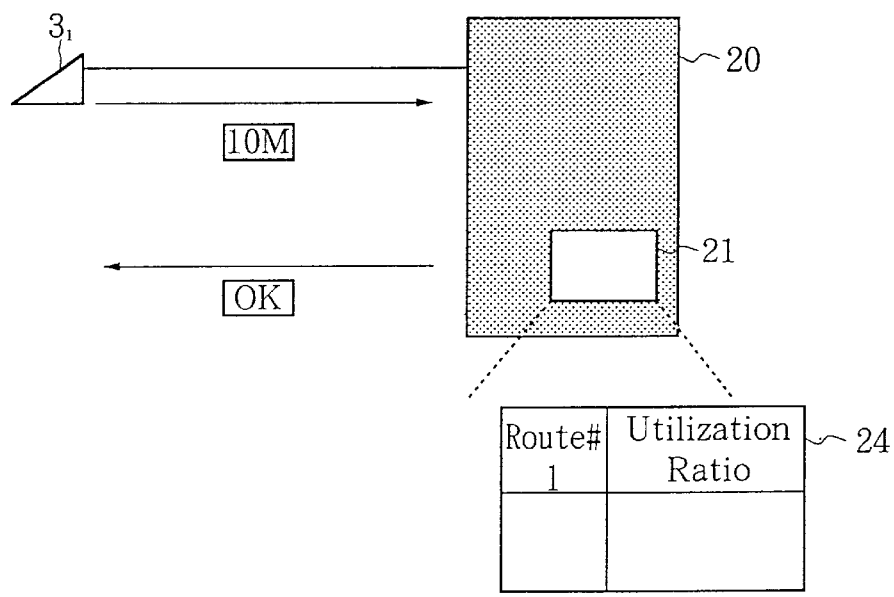
FIG. 11 shows the flow of RM cells in a Fast Resource Management (FRM) protocol.
Figure 12:
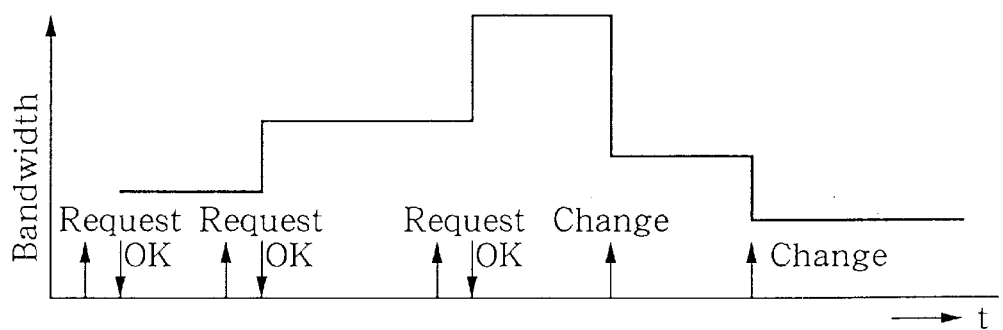
FIG. 12 shows bandwidth change in an FRM protocol.

An example of the operation of the first, second, third and fourth embodiments of this invention at a subscriber switch will be explained with reference to FIG. 11 and FIG. 12. FIG. 11 shows the flow of RM cells in a Fast Resource Management protocol (FRM), and FIG. 12 shows bandwidth change in the FRM protocol. In FIG. 12, time is plotted along the horizontal axis and bandwidth along the vertical axis. In response to a request from terminal $3_1$ for a bandwidth change, subscriber switch 20 indexes route performance table 24 of routes to which the VC in question belongs, and looks, for example, at the bandwidth utilization ratio. This "utilization ratio" may in fact be information relating to the link with the highest utilization ratio on those routes. Protocol controller 21 estimates residual bandwidth, etc. on the basis of this utilization ratio, and replies to terminal $3_1$, granting the change of bandwidth, etc.

As shown in FIG. 11, terminal $3_1$ outputs a request for a 10 Mb/s bandwidth increase to subscriber switch 20. Subscriber switch 20 then indexes route performance table 24 in protocol controller 21, examines the routes and their utilization ratios, and rapidly sends an answer back to terminal $3_1$. Consequently, as shown in FIG. 12, if this invention is used the time taken from REQUEST to OK can be shortened.

Figure 13:
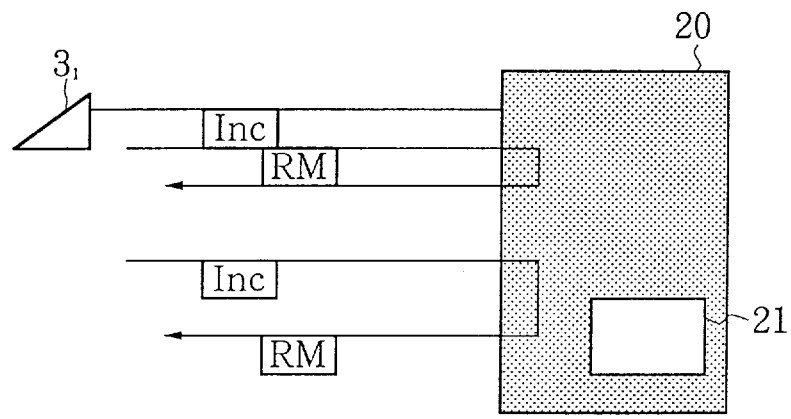
FIG. 13 shows the flow of RM cells in an ABR protocol.
Figure 14:
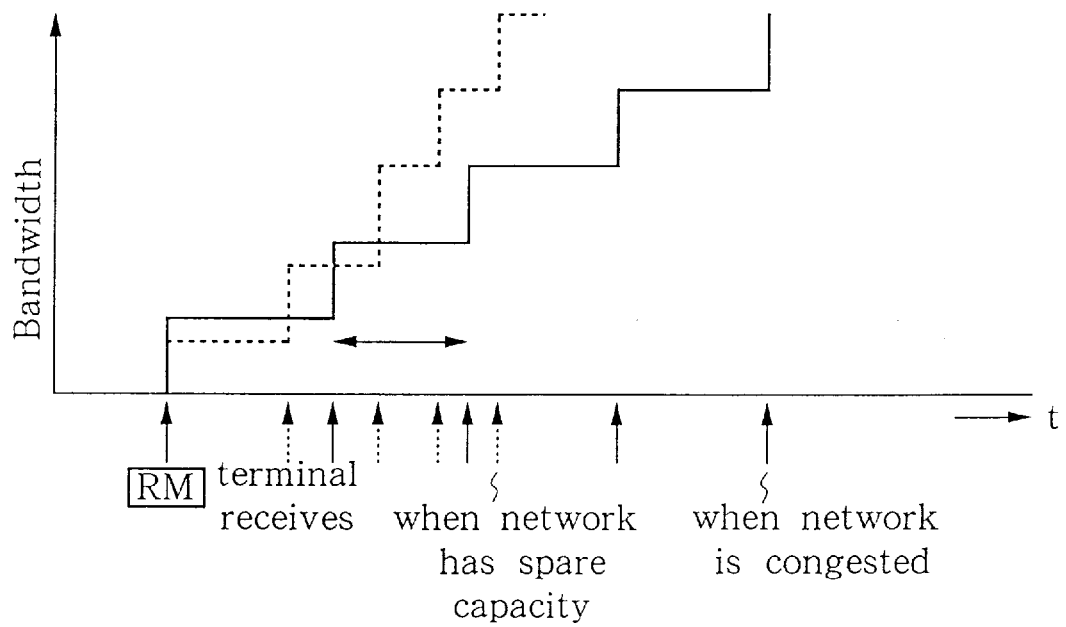
FIG. 14 shows bandwidth change in an ABR protocol.

FIG. 13 shows the flow of RM cells in an ABR protocol. FIG. 14 shows bandwidth change in an ABR protocol, with time being plotted along the horizontal axis and bandwidth along the vertical axis. The method employed in the ABR protocol example shown here is to increase bandwidth step-wise every time there is a bandwidth increase request "Inc" from terminal $3_1$. As shown in FIG. 13, in response to a bandwidth increase request "Inc", subscriber switch 20 indexes route performance table 24 in protocol controller 21, examines the routes and their utilization ratios, and rapidly sends RM cells back to terminal $3_1$ as the reply. Consequently, as shown in FIG. 14, terminal $3_1$ is able to increase bandwidth step-wise every time it receives an RM cell. Terminal $3_1$ may also receive an increase rejection or a decrease request from subscriber switch 20 via an RM cell, and in these cases terminal $3_1$ decreases the bandwidth step-wise. In either case, if this invention is employed, the time from when subscriber switch 20 receives a bandwidth increase request "Inc" until it returns the RM cell as a response to this request can be shortened.

Figure 15:
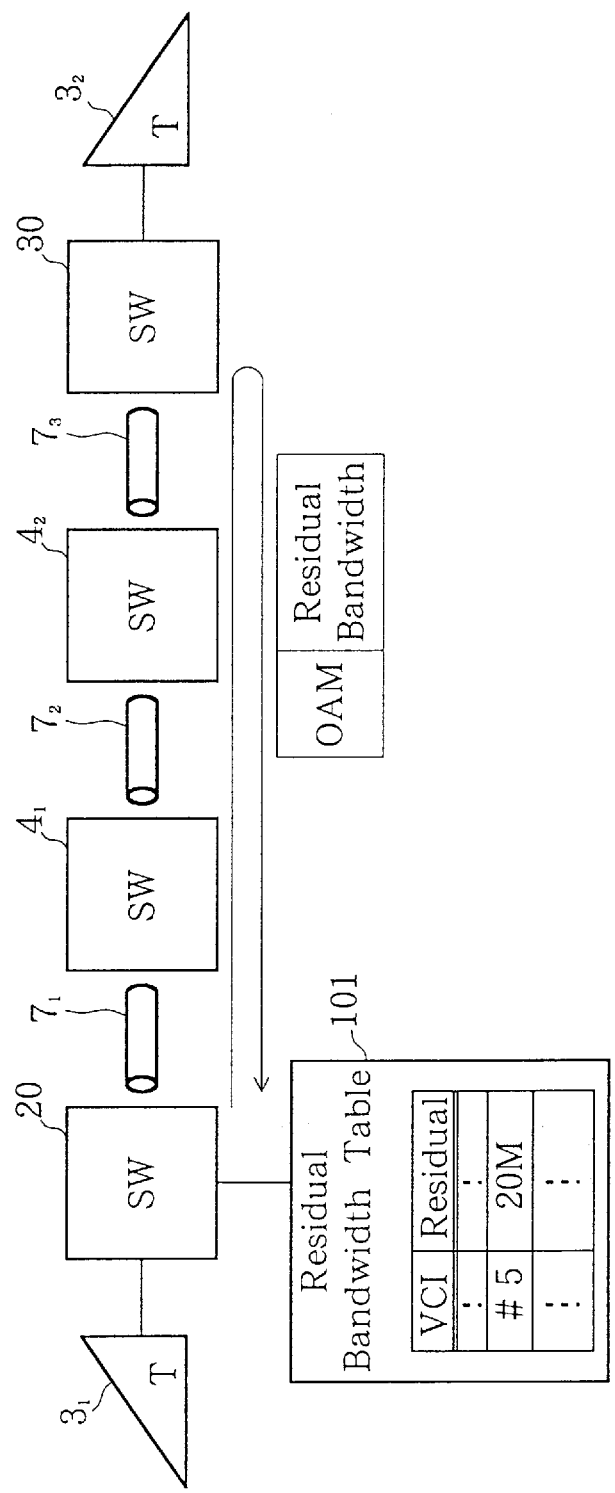
FIG. 15 shows the overall configuration of a variable-bandwidth network according to a fifth embodiment of this invention.

A fifth embodiment of this invention will be explained with reference to FIG. 15, which shows the overall configuration of a variable-bandwidth network according to this fifth embodiment. A variable-bandwidth network according to this fifth embodiment comprises: transmission links $7_1$–$7_3$; transit switches $4_1$ and $4_2$ disposed on this transmission path; terminal $3_1$ which transmits information at a cell output rate that has been set variably in accordance with the bandwidth utilization of the transmission path; terminal $3_2$ which receives this information; and subscriber switches 20 and 30 which respectively serve terminals $3_1$ and $3_2$ and connect them to the transmission path. Subscriber switch 20 has residual bandwidth table 101 which stores information relating to the bandwidth utilization of the transmission path (in FIG. 15, the table is shown external to subscriber switch 20). When there has been a bandwidth change request from terminal $3_1$ served by subscriber switch 20, said subscriber switch can decide for or against that bandwidth change of terminal $3_1$ by comparing it with the residual bandwidth stored in its residual bandwidth table 101. Residual bandwidth table 101 stores and manages, for each VCI, the switch buffer to which that connection belongs, and the residual bandwidth of the transmission path.

Figure 16:
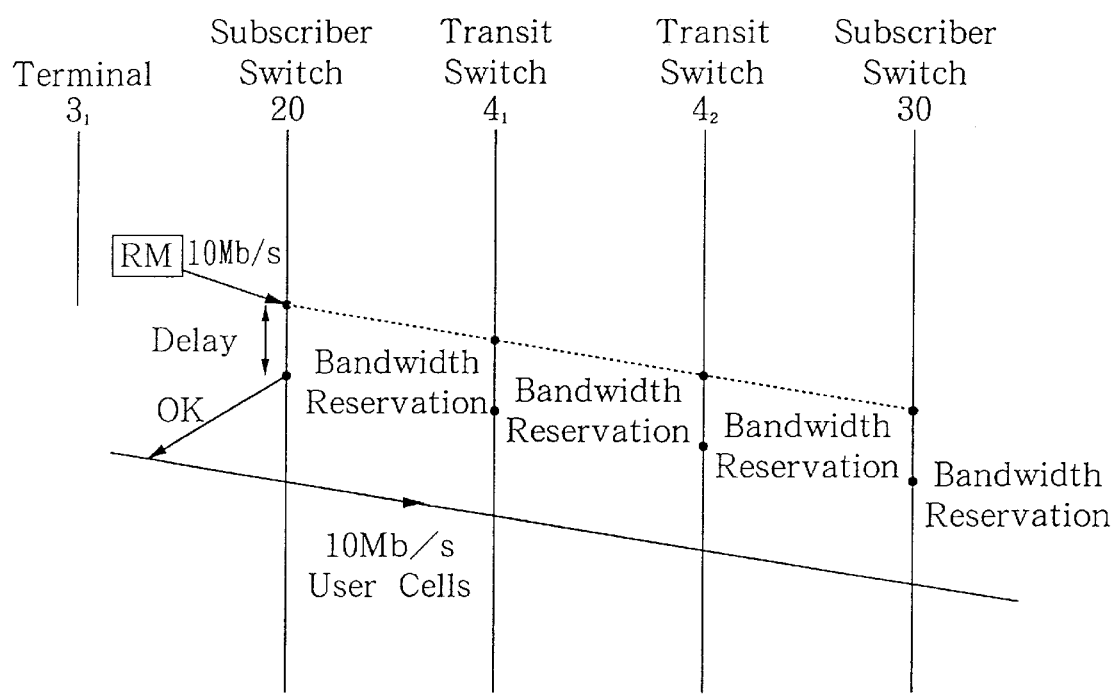
FIG. 16 shows an operation timing chart according to this fifth embodiment of the invention.

FIG. 16 shows an operation timing chart for this fifth embodiment of the invention. When terminal $3_1$ outputs a bandwidth change request to the network, subscriber switch 20 which serves this terminal $3_1$ receives the request and decides for or against it. In other words, subscriber switch 20 compares, for the VCI of the request, the requested bandwidth and the contents of residual bandwidth table 101. If the request is within the residual bandwidth, subscriber switch 20 permits transfer, while a request in excess of the residual bandwidth is rejected. Terminal $3_1$ begins to transfer cells as soon as acceptance of the request is returned to terminal $3_1$ from subscriber switch 20. In addition, the RM cell bearing the request from terminal $3_1$ is transferred just as it is to the next switch, and each transit switch reserves the requested bandwidth.

Figure 17:
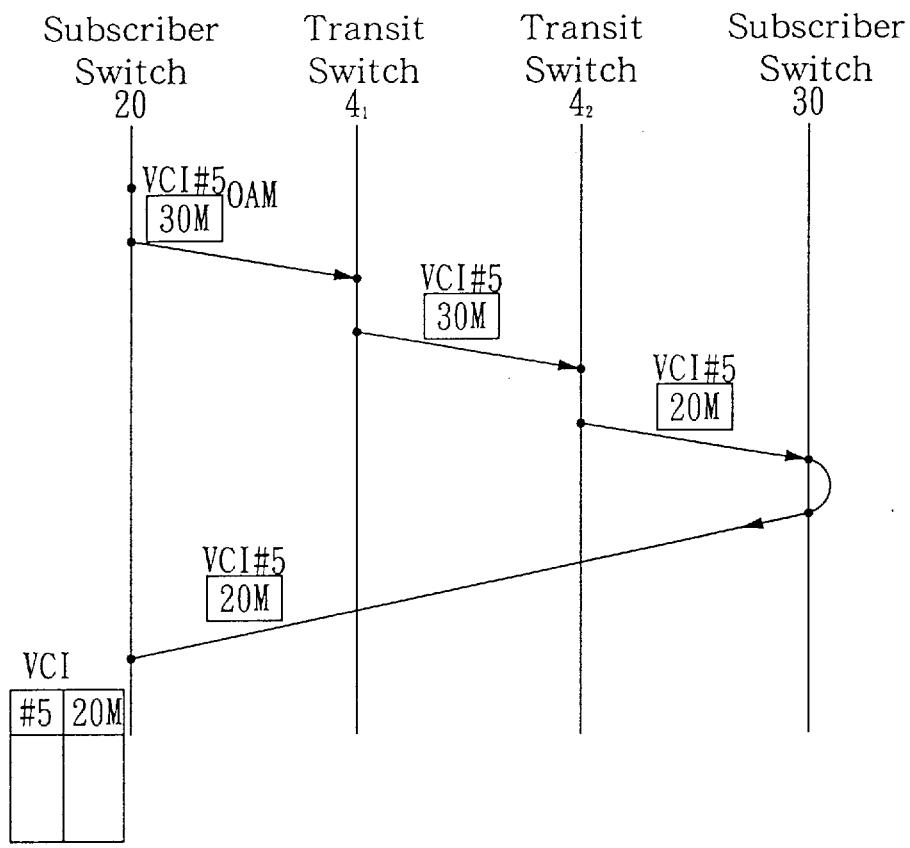
FIG. 17 shows the residual bandwidth checking sequence in the normal state in which there is no bandwidth change request.
Figure 18:
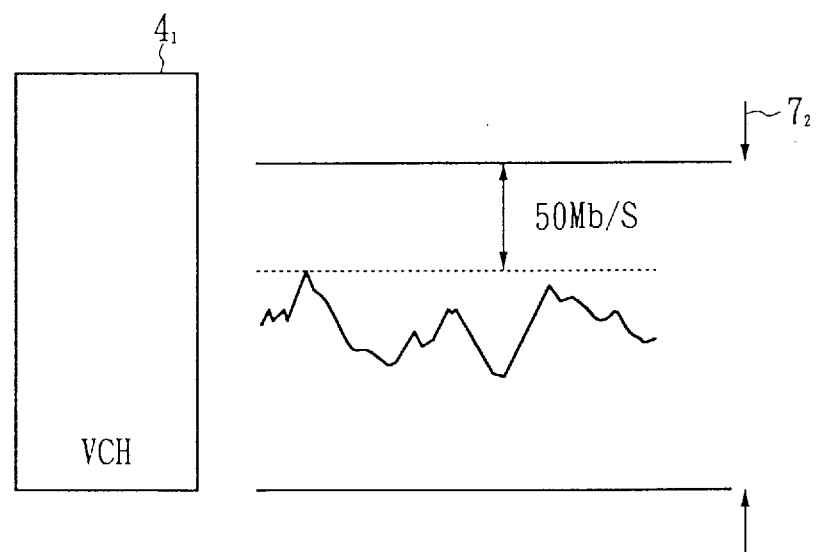
FIG. 18 shows how a transit switch obtains the residual bandwidth of a transmission link.

FIG. 17 shows the residual bandwidth checking sequence in the normal state in which there is no bandwidth change request, while FIG. 18 shows how the residual bandwidth of transmission link $7_2$ is obtained by transit switch $4_1$. Subscriber switch 20 puts the relevant VCI number in an OAM cell, enters its own residual bandwidth, and sends the cell to the next stage. The residual bandwidth of the relevant transmission paths, etc. is continually obtained at each switch. This residual bandwidth can be found on the basis of observations using low-pass filters. Alternatively, the utilized bandwidth may be calculated by using low-pass filters to obtain the sum of (i) the value obtained by multiplying the cell receiving rate measured the previous time by a smoothing coefficient $\alpha$, and (ii) the value obtained by multiplying the newly-measured cell receiving rate by 1−α. The residual bandwidth may then be calculated from this value and taken as the allocatable residual bandwidth. It may also be obtained from the sum of the peaks when notification is made.

In the example shown in FIG. 17, because the residual bandwidth of transit switch $4_1$ is greater than the bandwidth entered in the OAM cell that has been sent to it, transit switch $4_1$ transfers this OAM cell to the next stage without any alteration. Transit switch $4_2$ has only 20 Mb/s of spare bandwidth, which is less than the 30 Mb/s bandwidth entered in the OAM cell, and therefore it rewrites the contents of the OAM cell. The minimum residual bandwidth at transit switches $4_1$ and $4_2$, transmission links $7_1$–$7_3$ and destination-side subscriber switch 30 are thus noted in the returned cell, and this information can be obtained by source-side subscriber switch 20. A residual bandwidth check of this kind is performed periodically, so that subscriber switch 20 continually finds out to what Mb/s the bandwidth of that VCI can be increased.

Figure 19:
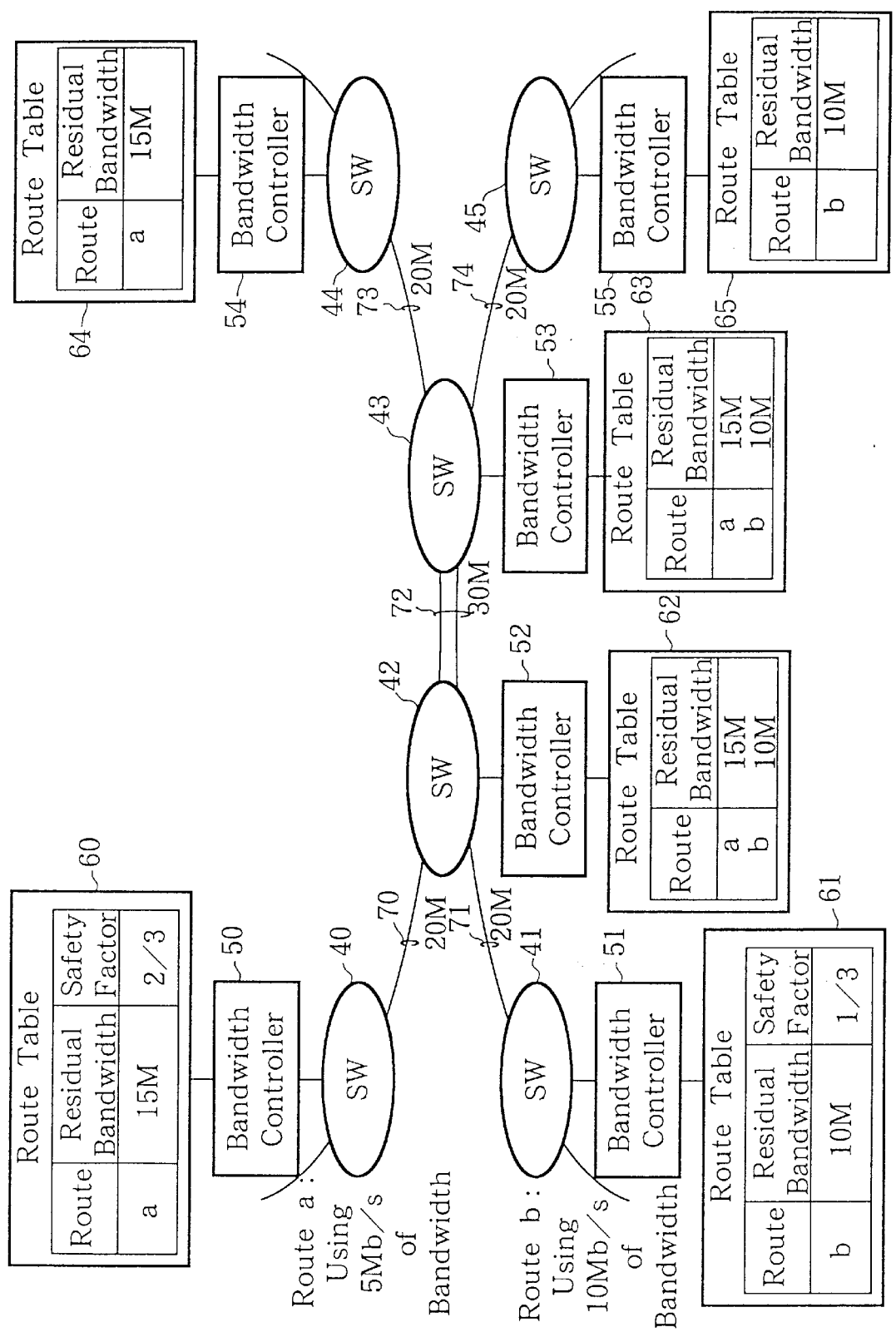
FIG. 19 shows the overall configuration of a variable-bandwidth network according to a sixth embodiment of this invention.

A sixth embodiment of this invention will be explained with reference to FIG. 19, which shows the overall configuration of a variable-bandwidth network according to this sixth embodiment. This sixth embodiment comprises a plurality of switches 40–45 disposed in a variable-bandwidth network and capable of mutual transfer of information, and this plurality of switches 40–45 have respective bandwidth controllers 50–55 for dynamically changing the bandwidth during calls in accordance with requests from subscribers.

For each route assigned to information transfer between subscribers, bandwidth controllers 50–55 periodically measure the residual bandwidth that could be additionally allocated to that route, and in response to a bandwidth change request from a subscriber, decide for or against that bandwidth change, this decision being made at the switch that serves the subscriber in question. The residual bandwidth that has been measured by bandwidth controllers 50–55 is recorded in route tables 60–65.

It will be assumed here that switches 40 and 41 are subscriber switches which connect subscribers to the network, and that two routes are set: route a from switch 40 via switches 42, 43 and 44, and route b from switch 41 via switches 42, 43 and 45. The capacities of links 70, 71, 73 and 74 which lie respectively between switches 40 and 42, 41 and 42, 43 and 44, and 43 and 45, are assumed to be 20 Mb/s each, while the capacity of link 72 between switches 42 and 43 is assumed to be 30 Mb/s. Route a is assumed to be using 5 Mb/s of bandwidth, and route b is assumed to be using 10 Mb/s of bandwidth. The bandwidth being used in links 70–74 is therefore respectively 5, 10, 15, 5 and 10 Mb/s, so that 15 Mb/s of residual bandwidth is available on route a and 10 Mb/s of residual bandwidth is available on route b. Information relating to these residual bandwidths is stored in route tables 60–65 of the respective switches 40–45.

For all the routes that pass through these switches, their unused bandwidth is noted in respective route tables 60–65 and is periodically updated. In the present example, if the utilized bandwidth in route b is increased by 10 Mb/s at time T, the route tables are not updated at the instant of the bandwidth increase. Instead, they are updated at the next updating period. In the present case, the residual bandwidths of routes a and b in route tables 60 and 61 will be updated at the next updating period to 5 Mb/s and 0 Mb/s, respectively. However, if a 15 Mb/s bandwidth increase is requested for route a before the next updating period, then because the route table of switch 40 has not yet been updated, this request ends up being accepted, with the result that a bandwidth of 40 Mb/s is allocated to link 72.

Accordingly, in this sixth embodiment a preset safety factor is recorded beforehand for each route in route tables 60 and 61 of switches 40 and 41, which are the subscriber switches. As a result, the fact that there may be a plurality of bandwidth change requests within the same residual bandwidth measurement period is taken into account, and bandwidth controllers 50 and 51 take the result of multiplying the measured residual bandwidth of each route by this safety factor as the allocable residual bandwidth of the route in question. Part of the measured bandwidth is therefore left for another bandwidth change request. In the present example, if ⅔ and ½ are set as the safety factors for route a and route b respectively, a bandwidth increase of only 5 Mb/s will be allowed at time T when a bandwidth increase of 10 Mb/s is requested for route b. As a result, when the 15 Mb/s bandwidth increase request is subsequently made for route a, 10 Mb/s can be allocated without overbooking occurring.

Figure 20:
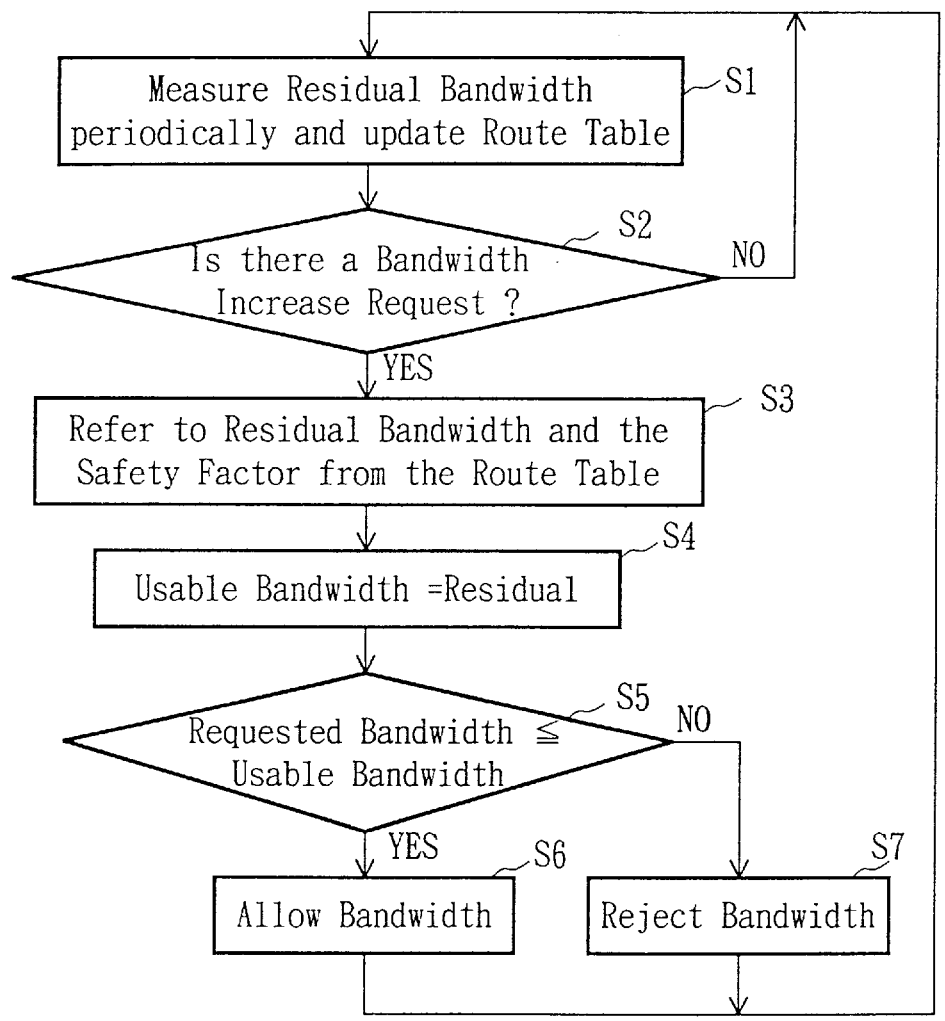
FIG. 20 shows the control flow of the bandwidth controller in a subscriber switch.

FIG. 20 shows the control flow of the bandwidth controllers (in this example, 50 and 51) in the subscriber switches. First of all, residual bandwidth is measured periodically and the route table updated (S1). If there is a bandwidth increase request (S2), the residual bandwidth and the safety factor are referred to from the route table (S3).

Next, the following computation is performed (S4): usable bandwidth=residual bandwidth×safety factor. If the result of this is: requested bandwidth≦usable bandwidth (S5), then the bandwidth increase is allowed (S6). If requested bandwidth >usable bandwidth (S5), then the bandwidth increase is rejected (S7).

In order to simplify the explanation, it has been assumed that a safety factor is recorded in route tables 60 and 61 only. However, in each switch which can serve as a subscriber switch there are recorded safety factors for each route used by subscribers served by that switch.

Figure 21:
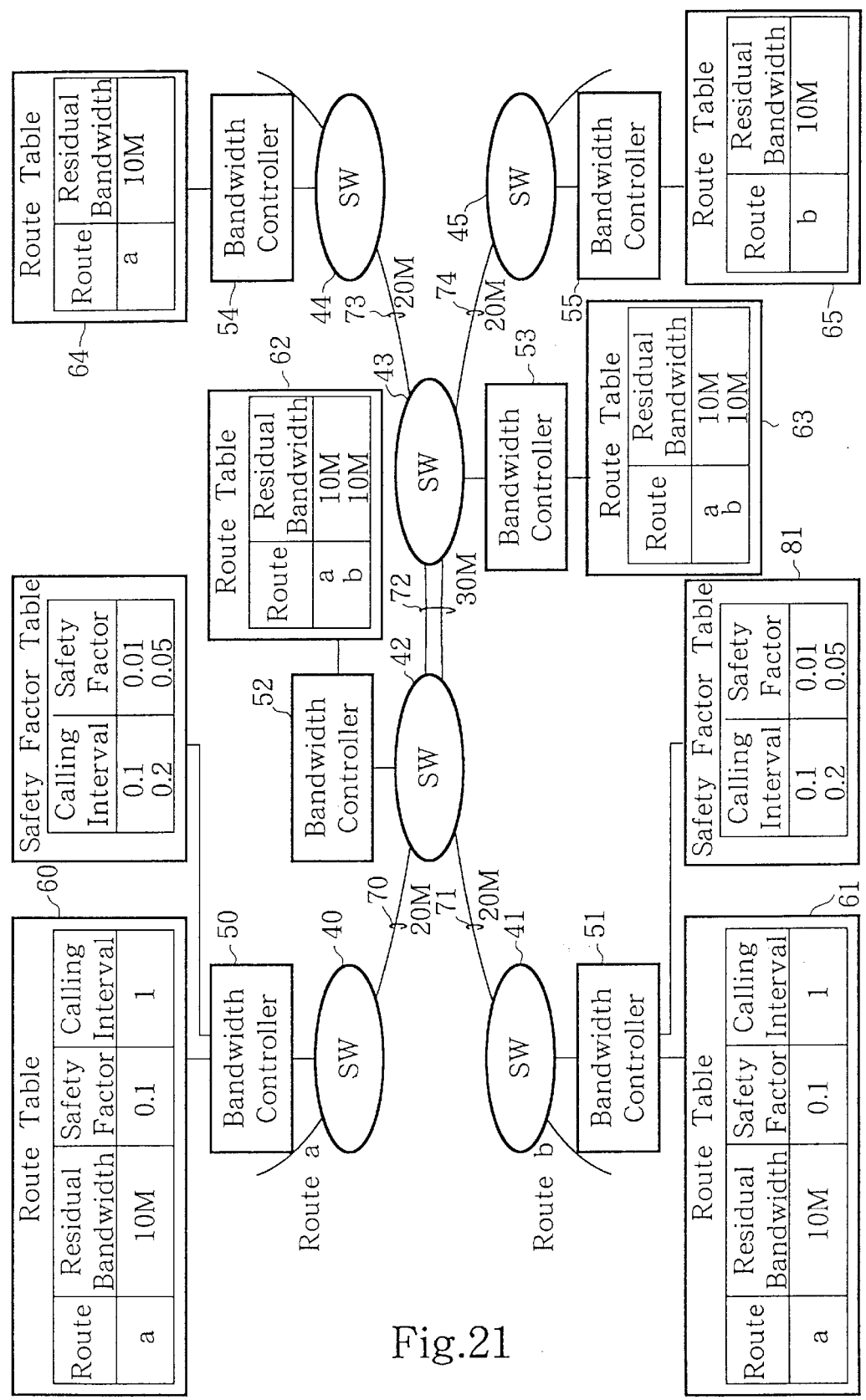
FIG. 21 shows the overall configuration of a variable-bandwidth network according to a seventh embodiment of this invention.
Figure 22:
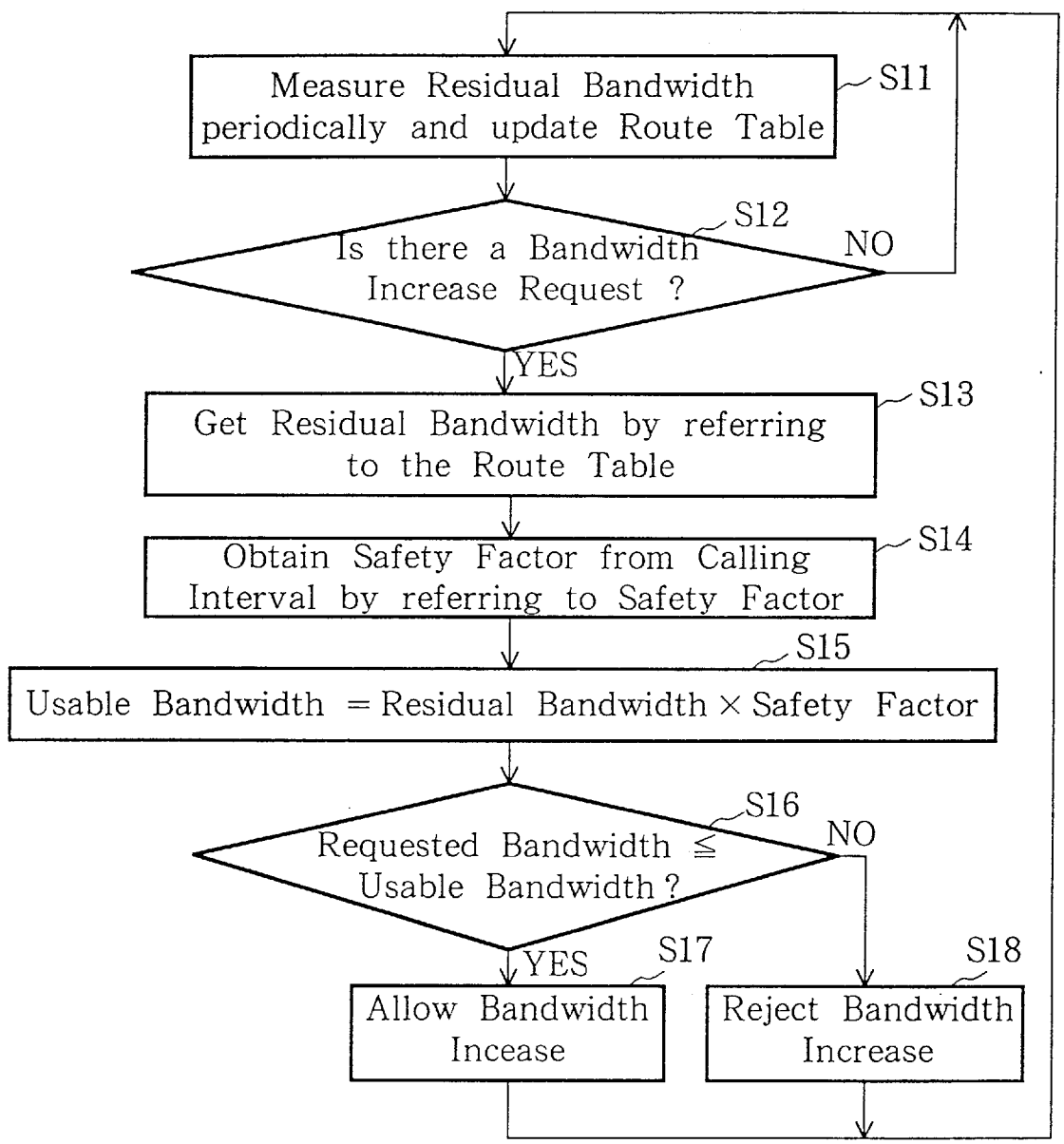
FIG. 22 shows the control flow of the bandwidth controller in a subscriber switch.

A seventh embodiment of this invention will be explained with reference to FIG. 21, which shows the overall configuration of a variable-bandwidth network according to this seventh embodiment. FIG. 22 shows the control flow of the bandwidth controller in a subscriber switch, according to this seventh embodiment. The probability of overbooking occurring is related to the period of the monitoring of unused bandwidth of a route (hereinafter, termed the "window size") and to the intervals at which bandwidth change requests occur. In this seventh embodiment of the invention, the safety factor is changed adaptively in accordance with the interval at which bandwidth change requests occur. In other words, the allocable residual bandwidth is obtained by multiplying the measured residual bandwidth by a safety factor that is determined by the intervals at which bandwidth change requests relating to that route have occurred up to that point in time.

In this seventh embodiment, a field which holds the interval at which bandwidth change requests occur for a route (hereinafter, termed the "calling interval") is added to route tables 60 and 61. In addition, switches 40 and 41 are provided with safety factor tables 80 and 81 for deriving the safety factor from the calling interval recorded in route tables 60 and 61. The relation between calling interval and safety factor is recorded in these safety factor tables 80 and 81.

In switch 40, the first step of the process of deciding for or against a bandwidth change is to obtain the safety factor from the calling interval by referring to safety factor table 80. In the next step, the usable bandwidth is obtained by multiplying the residual bandwidth of route a by the safety factor obtained in the first step. In the third step, if the requested bandwidth is less than or equal to the usable bandwidth obtained in step 2, the request is allowed. Otherwise, the request is rejected. The same steps are performed when switch 41 or any other switch becomes a subscriber switch and performs bandwidth changes.

An explanation will now be given of the derivation of a safety factor table on the assumption that the occurrence of bandwidth change requests conforms to a Poisson process. In this derivation, it will be assumed that all the requested bandwidths are the same and that none of the resulting changes in bandwidth is a decrease. The probability of overbooking occurring $P_{ob}$ when the unused bandwidth is B can be expressed by the following formula:

$$P_{ob} = \sum_{k=B \text{ to } \infty} (1/w)^k e^{-1/w} / k!$$

where w is the normalized interval at which bandwidth change requests occur (the reciprocal of the calling rate), and B is the normalized increase in bandwidth due to a bandwidth request.

FIG. 22 shows the control flow of the bandwidth controller in a subscriber switch. First of all, the residual bandwidth is measured periodically and the route table updated (S11). When there is a bandwidth increase request (S12), the residual bandwidth is found by referring to the route table (S13). The safety factor is then obtained from the calling interval by referring to the safety factor table (S14).

Next, the following computation is performed (S15): usable bandwidth=residual bandwidth×safety factor. If the result of this is: requested bandwidth≦usable bandwidth (S16), then the bandwidth increase is allowed (S17). If requested bandwidth>usable bandwidth (S16), then the bandwidth increase is rejected (S18).

Figure 23:
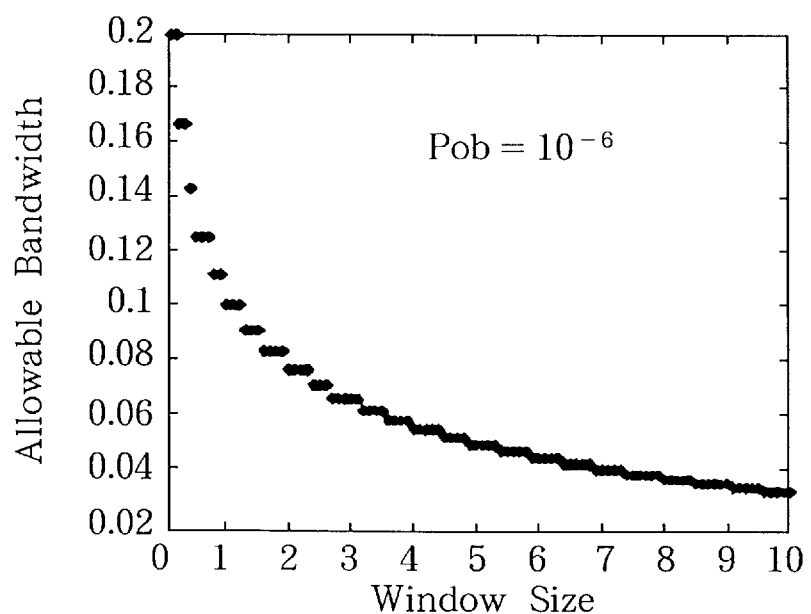
FIG. 23 shows the relation between window size and allowable bandwidth.

FIG. 23 shows the relation between window size and allowable bandwidth for a standard overbooking probability $P_{ob}$ of $10^{-6}$. It will be seen from FIG. 23 that the allowable bandwidth changes in accordance with the window size. For example, it will be seen that if the window size is 1, requested bandwidths of up to 0.1 can be allowed.

Because window size is normalized here by the interval between bandwidth requests, FIG. 23 is none other than a safety factor table. That is, if window size is taken as fixed and the numbers marked along the horizontal axis in FIG. 23 are changed to their reciprocals, FIG. 23 will show the relation between the bandwidth request interval and the safety factor. Table 1 shows specific numerical values of the allowable bandwidth (when the request interval is 1 ms) given a residual bandwidth of 75 Mb/s and a standard overbooking probability of $10^{-6}$. It will be seen that given the same 75 Mb/s residual bandwidth, the allowable bandwidth can be increased by making the window size smaller.

TABLE 1

| window size | allowable bandwidth |
| --- | --- |
| 1 ms | 7.50 Mb/s |
| 2 ms | 5.25 Mb/s |
| 4 ms | 3.75 Mb/s |
| 10 ms | 3.00 Mb/s |

Table 2 shows the design values for window size for a standard overbooking probability of $10^{-6}$ (when 1/10 of the residual bandwidth has been set as the allowable bandwidth). When the allowable bandwidth is set to the same proportion of the residual bandwidth (i.e., to 1/10), then window size should be set as shown in Table 2 in order to satisfy the same overbooking probability.

TABLE 2

| interval between requests | window size |
| --- | --- |
| 1.0 ms | 1.0 ms |
| 5.0 ms | 5.0 ms |
| 10.0 ms | 10.0 ms |
| 20.0 ms | 20.0 ms |

Figure 24:
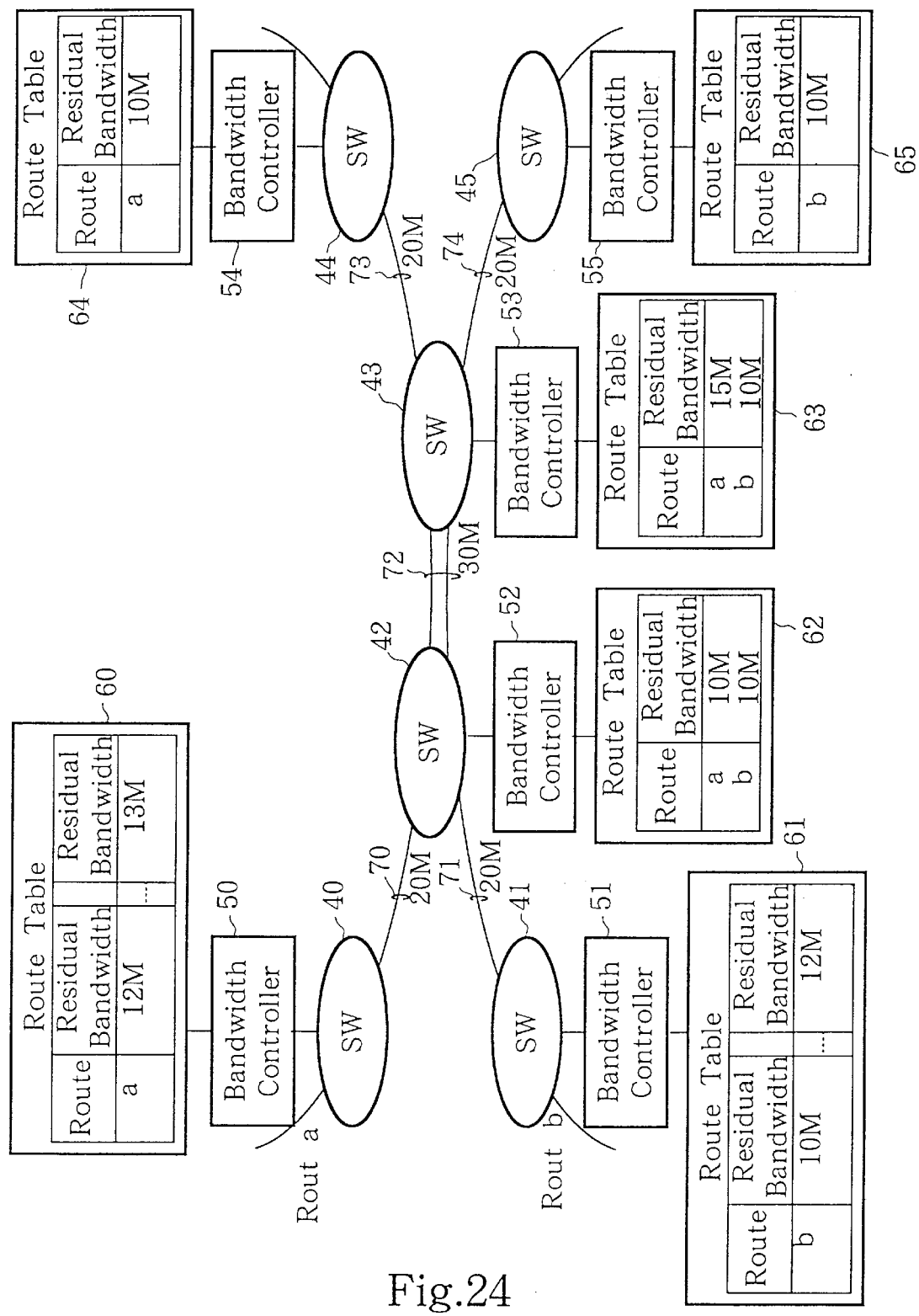
FIG. 24 shows the overall configuration of a variable-bandwidth network according to an eighth embodiment of this invention.
Figure 25:
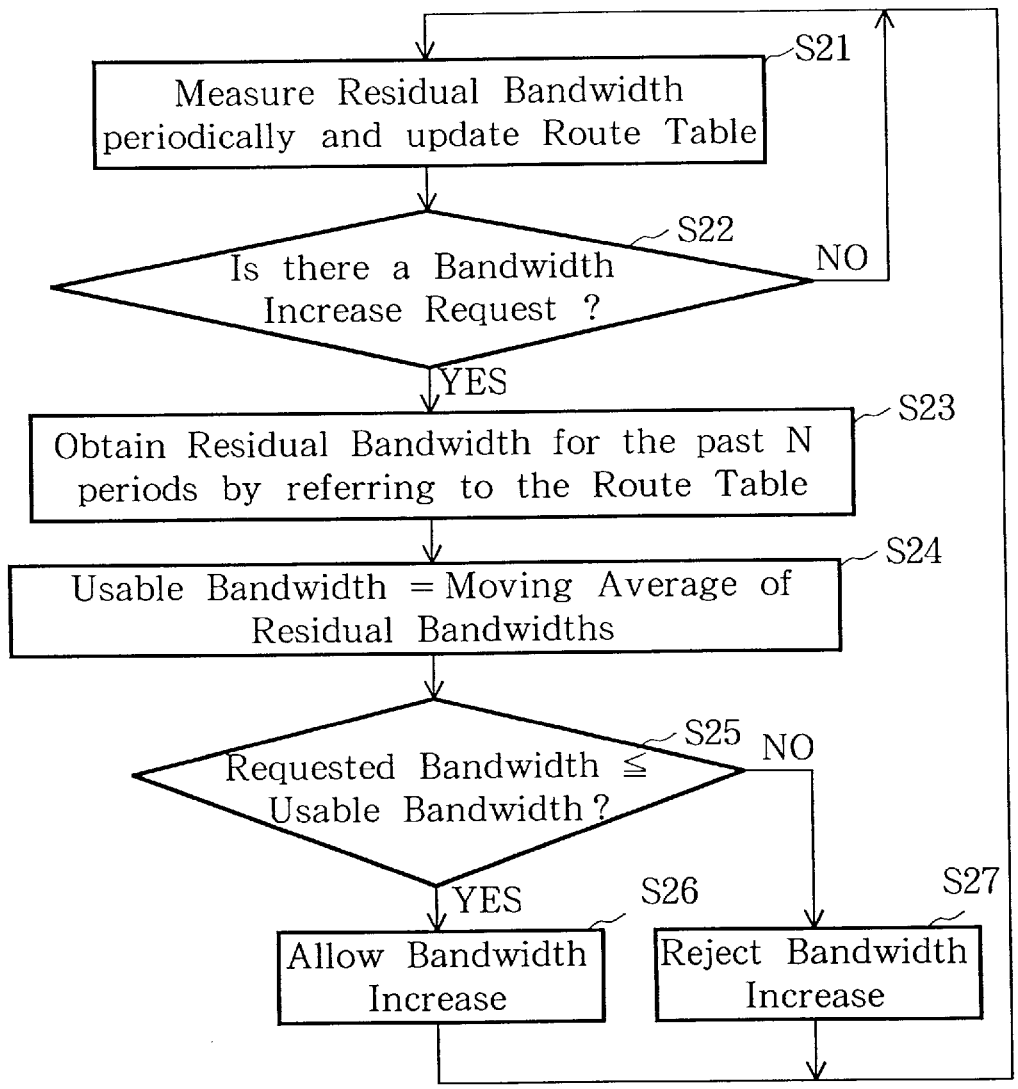
FIG. 25 is a flowchart showing the control flow of the bandwidth controller in a subscriber switch.

An eighth embodiment of this invention will be explained with reference to FIG. 24 and FIG. 25. FIG. 24 shows the overall configuration of a variable-bandwidth network according to this eighth embodiment, while FIG. 25 is a flowchart showing the control flow of a bandwidth controller in a subscriber switch. In this eighth embodiment of the invention, the allocable residual bandwidth is obtained on the basis of the measured increases and decreases in residual bandwidth up to the present point in time. The residual bandwidths of routes for the past N periods are therefore kept in route tables 60 and 61, and there is no field for a safety factor.

When a bandwidth change request has occurred for route a, bandwidth controller 50 of switch 40 compares the requested bandwidth with the moving average of the residual bandwidths of that route for the past N periods, as entered in route table 60. If the requested bandwidth is the smaller, then the request is accepted, but if the requested bandwidth is not smaller, the request is rejected. The same steps are performed when switch 41 or any other switch becomes a subscriber switch and per forms bandwidth changes.

FIG. 25 is a flowchart showing the control flow of the bandwidth controller in a subscriber switch. Residual bandwidth is measured periodically and the route table updated (S21). If there is a bandwidth increase request (S22), the residual bandwidths for the past N periods are found by referring to the route table (S23).

The following computation is then performed (S24): usable bandwidth=moving average of residual bandwidths. If the result of this is: requested bandwidth≦usable bandwidth (S25), then the bandwidth increase is allowed (S26). If requested bandwidth>usable bandwidth (S25), the bandwidth increase is rejected (S27).

Figure 26:
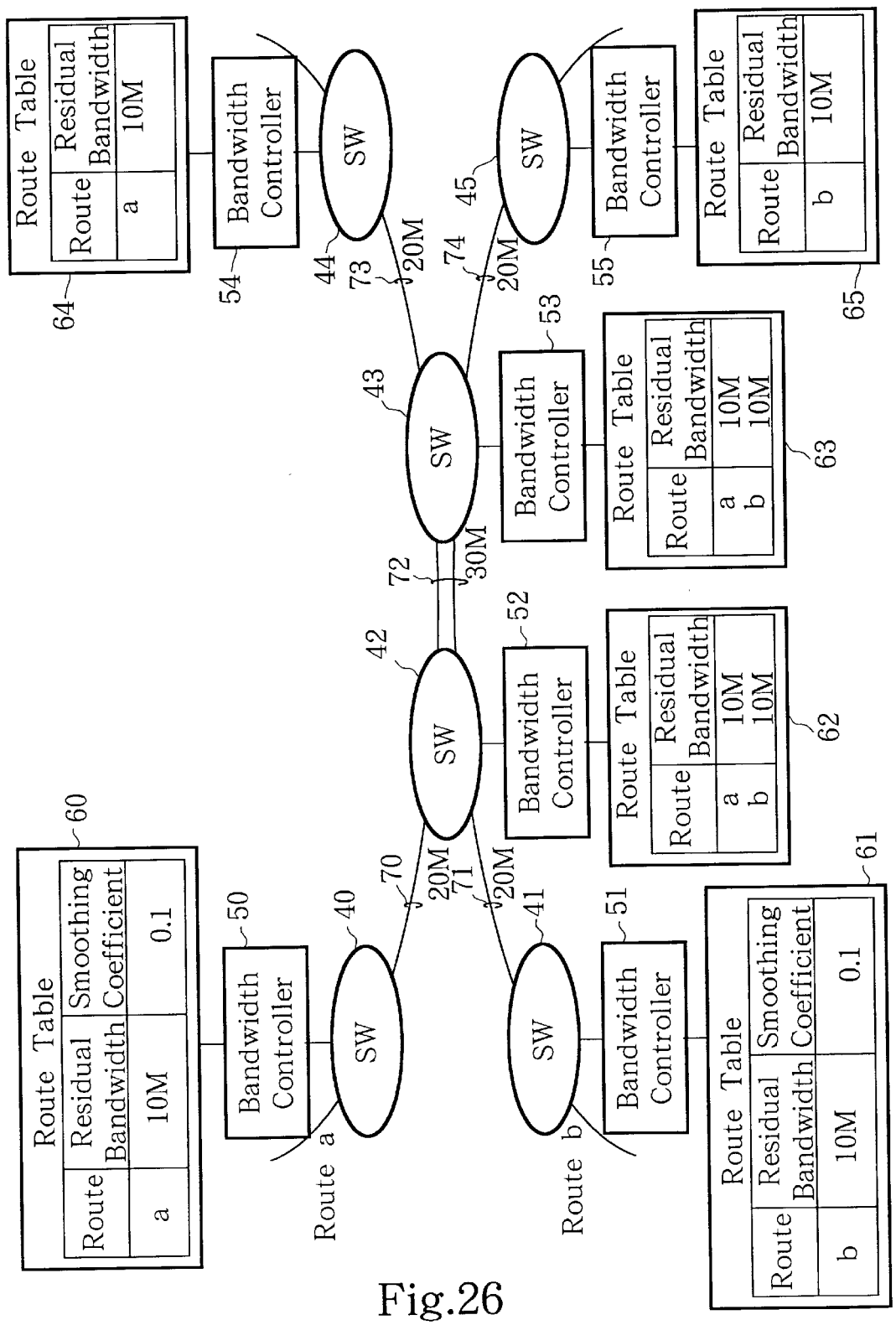
FIG. 26 shows the overall configuration of a variable-bandwidth network according to a ninth embodiment of this invention.
Figure 27:
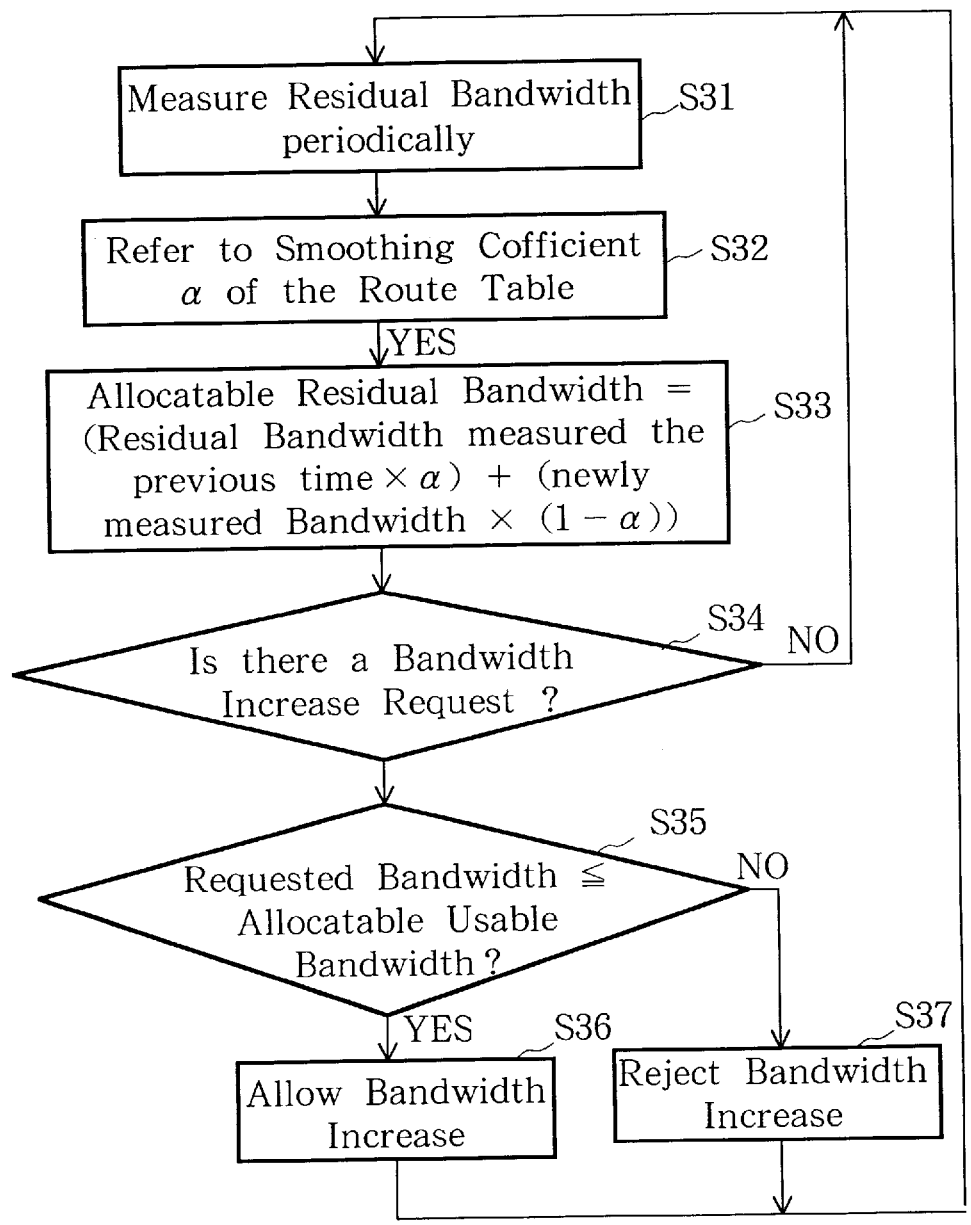
FIG. 27 is a flowchart showing the control flow of the bandwidth controller in a subscriber switch.

A ninth embodiment of this invention will be explained with reference to FIG. 26 and FIG. 27. FIG. 26 shows the overall configuration of a variable-bandwidth network according to this ninth embodiment, while FIG. 27 is a flowchart showing the control flow of the bandwidth controller in a subscriber switch. In this ninth embodiment of the invention, the residual bandwidth of each route and a smoothing coefficient a for smoothing the residual bandwidth observed in each updating period are held in route tables 60 and 61. There is no safety factor field. When the residual bandwidth entered in route table 60 of switch 40 is updated, the sum of (i) the value obtained by multiplying the residual bandwidth measured the previous time by a smoothing coefficient α, and (ii) the value obtained by multiplying the newly-measured residual bandwidth by 1−α, is recorded as the allocatable residual bandwidth. In other words, switch 40 applies a first-order filter to the residual bandwidth of route a and takes the result as the residual bandwidth of the next updating period. When a bandwidth change request has occurred for route a, the requested bandwidth is compared with the filtered residual bandwidth that has been entered in route table 60. If the requested bandwidth is the smaller, then this request is accepted, but if the requested bandwidth is not smaller, the request is rejected. The same steps are performed when switch 41 or any other switch becomes a subscriber switch and performs a bandwidth change.

FIG. 27 is a flowchart showing the control flow of a bandwidth controller in a subscriber switch. First of all, the residual bandwidth is measured periodically (S31). Next, the smoothing coefficient α of the route table is referred to (S32).

The following computation is then performed (S33): allocable residual bandwidth=(residual bandwidth measured the previous time=α)+(newly-measured residual bandwidth×(1−α)). If there is a bandwidth increase request (S34) and if: requested bandwidth≦allocable residual bandwidth, then the bandwidth increase is allowed (S36). If requested bandwidth>allocable residual bandwidth, the bandwidth increase is rejected (S37).

Figure 28:
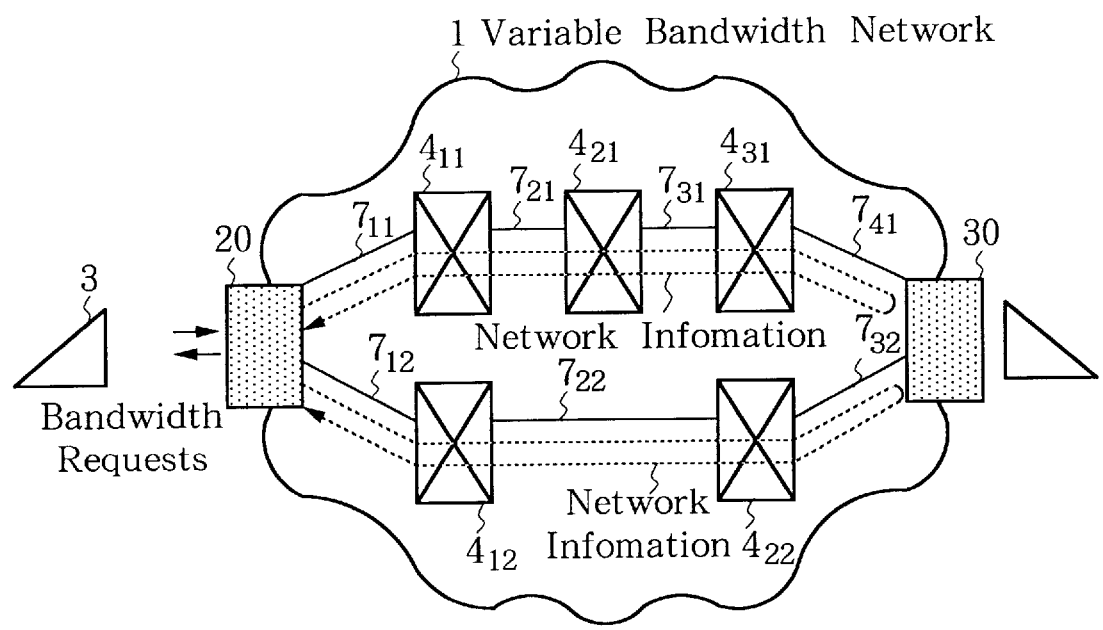
FIG. 28 shows the overall configuration of a variable-bandwidth network according to a tenth embodiment of this invention.
Figure 29:
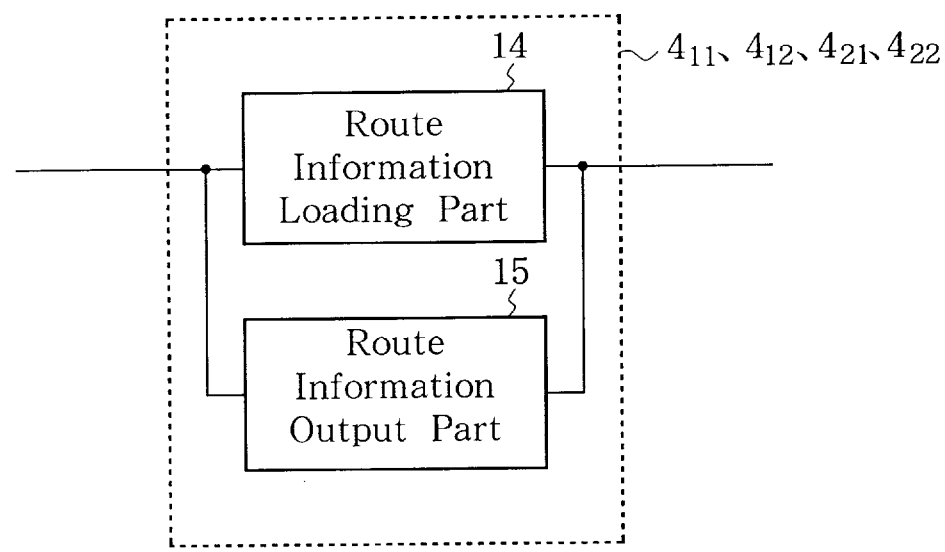
FIG. 29 is a block diagram of a transit switch and a destination-side subscriber switch according to this tenth embodiment.

A tenth embodiment of this invention will be explained with reference to FIG. 28, FIG. 29 and FIG. 2. FIG. 28 shows the overall configuration of a variable-bandwidth network according to this tenth embodiment. FIG. 29 is a block diagram of a transit switch and a destination-side subscriber switch in this tenth embodiment. A source-side subscriber switch according to this tenth embodiment of the invention is the same as the source-side subscriber switch in the first embodiment, a block diagram of which is shown in FIG. 2. This tenth embodiment of the invention is a variable-bandwidth network comprising subscriber switches 20 and 30, transmission links $7_{11}$, $7_{12}$, $7_{21}$, $7_{22}$, $7_{31}$, $7_{32}$ and $7_{41}$; which are physical transmission paths connecting these subscriber switches 20 and 30 to each other, and transit switches $4_{11}$, $4_{12}$, $4_{21}$, $4_{22}$ and $4_{31}$ interposed among these transmission links. In this variable-bandwidth network, routes are set between subscriber switches 20 and 30 via transit switches $4_{11}$, $4_{12}$, $4_{21}$, $4_{22}$ and $4_{31}$, and subscriber switch 20 or 30 has protocol controller 21, shown in FIG. 2, as means which supports the protocols whereby terminal 3 performs adaptive flow control between itself and variable-bandwidth network 1.

One feature of this tenth embodiment of the invention is that subscriber switch 20 comprises: route information collector 22 as means for collecting and recording, irrespective of whether there is a connection request, new route information that includes the hop number (the number of transit switch stages), the current utilized bandwidth, and the residual bandwidth of the plurality of routes set between source-side subscriber switch 20 and another subscriber switch 30 which constitutes the destination-side subscriber switch; and protocol controller 21 as means which, when there is a connection request, selects a route for the user on the basis of this recorded route information (the configuration of subscriber switch 20 is the same as that shown in FIG. 2).

Route information collector 22 of source-side subscriber switch 20 includes RM cell transmitter 23 as means for outputting RM cells for collecting the route information in respect of each of the aforesaid routes. Transit switches $4_{11}$, $4_{12}$, $4_{21}$, $4_{22}$ and $4_{31}$, and destination-side subscriber switch 30 each have route information loading part 14, shown in FIG. 29, as means which loads route information into the data field of these RM cells when they arrive, and which then outputs the cells in accordance with the routing information recorded in their address field.

Destination-side subscriber switch 30 and transit switches $4_{11}$, $4_{12}$, $4_{21}$, $4_{22}$ and $4_{31}$ also have route information output part 15 as means for outputting the RM cells to source-side subscriber switch 20, these RM cells carrying route information relating to routes relevant to the switch in question.

As shown in FIG. 28, terminal 3 outputs cells to variable-bandwidth network 1 on the basis of various protocols relating to bandwidth change requests and so forth. The contents of these cells are determined immediately by subscriber switch 20 which serves the subscriber. Protocol controller 21 of subscriber switch 20 has route performance table 24 which manages information relating to the performance of routes through which relevant VCIs pass. Protocol controller 21 compares the contents of route performance table 24 with for example the bandwidth requested for a given VCI, and permits transfer, bandwidth change, and so forth.

FIG. 30 shows the contents of route performance table 24 according to the first embodiment of this invention. Residual bandwidth, current utilized bandwidth, and hop number are recorded for each route to destination A. In FIG. 28, the method employed to collect route information is to output RM cells of the sort shown in FIG. 3 from source-side subscriber switch 20 and to return these at destination-side subscriber switch 30. The RM cells comprise an address field H and a message field M. Route information such as bandwidth utilization ratio or residual bandwidth, cell loss ratio, etc. is loaded, by route information loading part 14 shown in FIG. 29, into message field M each time an RM cell passes through subscriber switch 30 or a transit switch $4_{11}$, $4_{12}$, $4_{21}$, $4_{22}$ and $4_{31}$. Routing information is written to address field H by subscriber switch 20.

Figure 31:
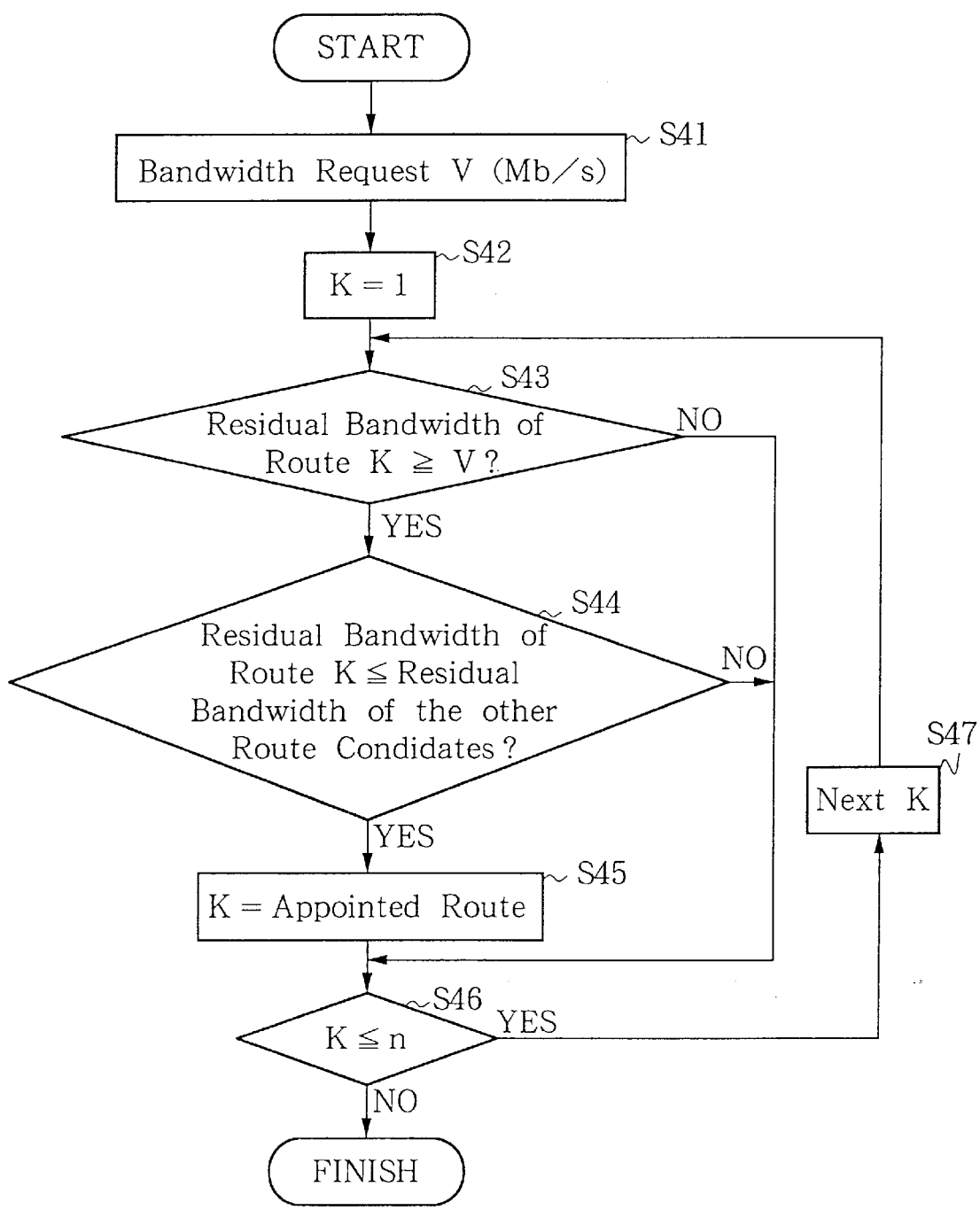
FIG. 31 is a flowchart showing the call admission procedure in the tenth embodiment of this invention.

The call admission procedure in this tenth embodiment of the invention will now be described. There are n routes from source-side subscriber switch 20 to destination-side subscriber switch 30. However, it is not known whether or not the bandwidth required for the call is available. FIG. 31 is a flowchart showing the call admission procedure according to this tenth embodiment. This procedure involves selecting and using, from among routes that can meet the requested bandwidth V Mb/s, the route with the smallest residual bandwidth.

When there is a bandwidth request of V Mb/s from terminal 3 (S41), the first route (K=1) is considered (S42) and it is decided whether or not the residual bandwidth of route K is equal to or greater than V Mb/s (S43). If the residual bandwidth of route K is not equal to or greater than the requested bandwidth V Mb/s and the value of K does not exceed n (the total number of routes) (S46), the next route is examined (S47). If the residual bandwidth of route K is equal to or greater than the requested bandwidth V Mb/s, it is decided whether or not the residual bandwidth of route K is smaller than the residual bandwidth of the other route candidates (S44). If the residual bandwidth of route K is greater than the residual bandwidth of other route candidates and the value of K does not exceed n (S46), the next route is examined (S47). If the residual bandwidth of route K is smaller than the residual bandwidth of the other route candidates, route K is taken as the appointed route (S45).

This enables route selection to be based on the so-called "packing rule". In addition, bandwidth acquisition can be carried out instantly. Moreover, because the intermediate nodes notify the source-side subscriber switch of residual bandwidth information etc. in advance, these intermediate nodes do not need to be processed in real time.

Figure 32:
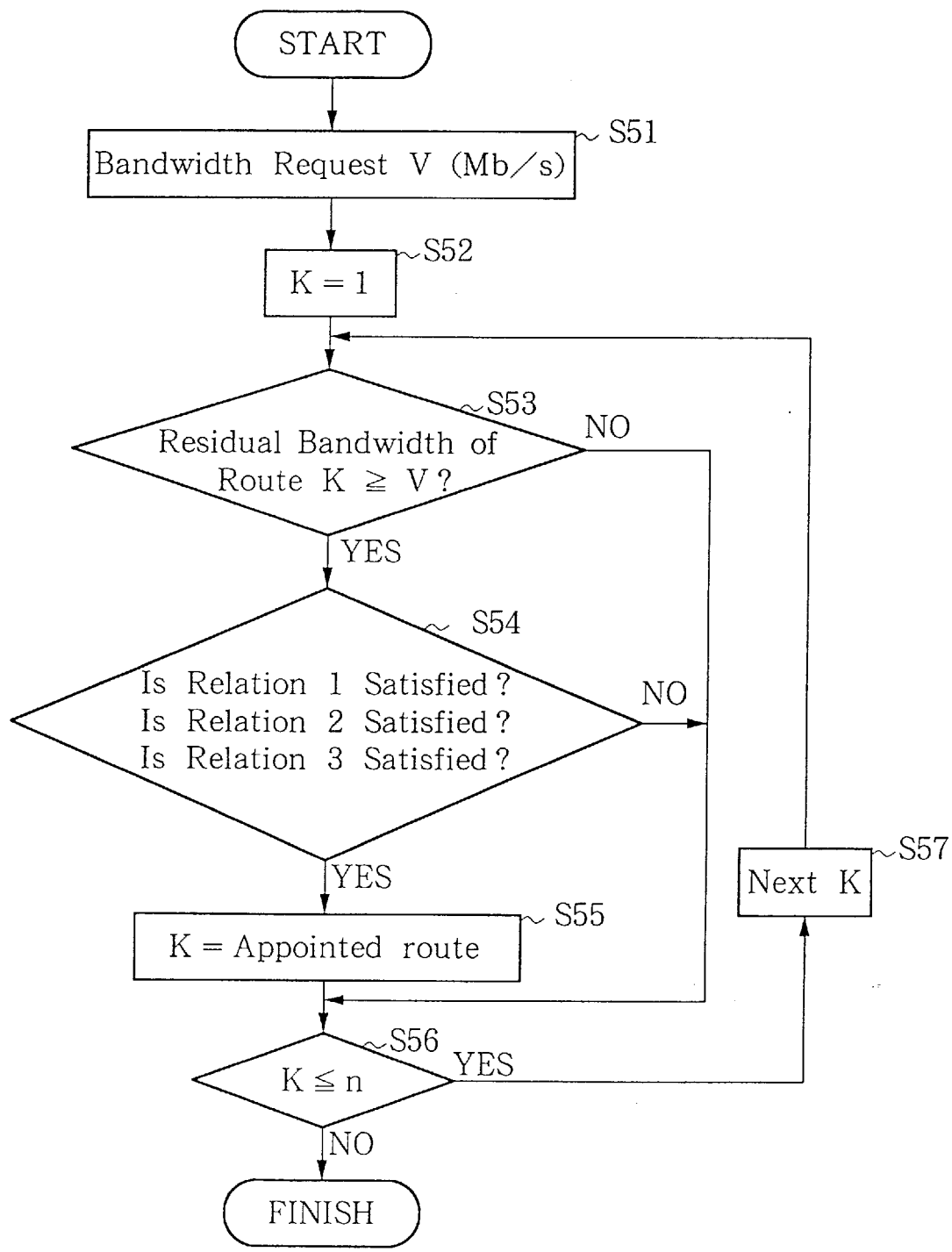
FIG. 32 is a flowchart showing the call admission procedure according to an eleventh embodiment of this invention.

An eleventh embodiment of this invention will be explained with reference to FIG. 32, which is a flowchart showing call admission procedures according to this eleventh embodiment. The procedures shown here are for selecting from n route candidates the route with the smallest residual bandwidth ratio; for selecting from n route candidates the route with the largest utilized bandwidth; and for selecting from n route candidates the route with the largest utilized bandwidth ratio.

An explanation will be given first of all of the procedure for selecting from n route candidates the route with the smallest residual bandwidth ratio. When there is a bandwidth request of V Mb/s from terminal 3 (S51), the first route (K=1) is considered (S52) and it is decided whether or not the residual bandwidth of route K is equal to or greater than the requested bandwidth V Mb/s (S53). If the residual bandwidth of route K is not equal to or greater than the requested bandwidth V Mb/s and the value of K does not exceed n (the total number of routes) (S56), the next route is examined (S57). If the residual bandwidth of route K is equal to or greater than the requested bandwidth V Mb/s, it is decided whether or not the following relation is satisfied (S54):

(residual bandwidth of route K)/
(residual bandwidth of route K + utilized bandwidth of route K)
$\leq$ (residual bandwidth of route candidates)/
(residual bandwidth of route candidates + utilized bandwidth of route candidates)

...(Eq. 1)

If route K does not satisfy the above relation and the value of K does not exceed n (S56), the next route is examined (S57). If route K does satisfy Eq. 1, route K is taken as the appointed route (S55).

Next, an explanation will be given of the procedure for selecting, from n route candidates, the route with the largest utilized bandwidth. When there is a bandwidth request of V Mb/s from terminal 3 (S51), the first route (K=1) is considered (S52) and it is decided whether or not the residual bandwidth of route K is equal to or greater than the requested bandwidth V Mb/s (S53). If the residual bandwidth of route K is not equal to or greater than the requested bandwidth V Mb/s and the value of K does not exceed n (S56), the next route is examined (S57). If the residual bandwidth of route K is equal to or greater than the requested bandwidth V Mb/s, it is decided whether or not it satisfies the following relation (S54): (utilized bandwidth of route K+V)$\geq$(utilized bandwidth of route (Eq. 2)) If route K does not satisfy the above relation and the value of K does not exceed n (S56), the next route is examined (S57). If route K does satisfy Eq. 2, route K is taken as the appointed route (S55).

An explanation will also be given of the procedure for selecting, from n route candidates, the route with the largest utilized bandwidth ratio. When there is a bandwidth request of V Mb/s from terminal 3 (S51), the first route (K=1) is considered (S52) and it is decided whether or not the residual bandwidth of this route K is equal to or greater than the requested bandwidth V Mb/s (S53). If the residual bandwidth of route K is not equal to or greater than the requested bandwidth V Mb/s and the value of K does not exceed n (S56), the next route is examined (S57). If the residual bandwidth of route K is equal to or greater than the requested bandwidth V Mb/s, it is decided whether or not it satisfies the following relation (S54):

(utilized bandwidth of route K + V)/
(residual bandwidth of route K + utilized bandwidth of route K)
$\geq$ (utilized bandwidth of route candidates + V)/
(residual bandwidth of route candidates + utilized bandwidth of route candidates)

...(Eq. 3)

If route K does not satisfy the above relation and the value of K does not exceed n (S56), the next route is examined (S57). If route K does satisfy Eq. 3, route K is taken as the appointed route (S55).

A twelfth embodiment of this invention will be explained with reference to FIG. 7, which shows how RM cells move through the network according to a second embodiment of this invention, and also shows how RM cells move through the network in the twelfth embodiment. Each transit switch $4_1$–$4_3$ or destination-side subscriber switch $30_1$ and $30_2$ shown in the twelfth embodiment of this invention reports route performance by periodically and autonomously sending RM cells to source-side subscriber switches $20_1$ and $20_2$.

A thirteenth embodiment of this invention will be explained with reference to FIG. 8 and FIG. 9. FIG. 8 is a block diagram of a centralized controller according to this thirteenth embodiment, and is the same as in the third embodiment. FIG. 9 shows the overall configuration of, and the transfer of RM cells in, this thirteenth embodiment, and is the same as the third embodiment. This thirteenth embodiment of the invention uses centralized controller 6 shown in FIG. 8 in the variable-bandwidth network of the tenth embodiment, illustrated in FIG. 28. Centralized controller 6 discovers the traffic conditions in variable-bandwidth network 1 and reports to subscriber switches $20_1$ and $20_2$ on the basis of information relating to congested nodes and so forth.

Centralized controller 6 shown in FIG. 8 has route information collector 60 which collects information from transit switches $4_1$–$4_3$ and subscriber switches $30_1$ and $30_2$. It collects the route information by receiving RM cells from transit switches $4_1$–$4_3$ and subscriber switches $30_1$ and $30_2$. The route information obtained is written by route information notification part 61 to message field M of RM cells over the existing route information, and the RM cells are then transferred to source-side subscriber switches $20_1$ and $20_2$.

The operation of a source-side subscriber switch will be explained with reference to FIG. 11, and this applies in common to the tenth to thirteenth embodiments of this invention. FIG. 11 shows the flow of RM cells in a Short Hold Mode (SHM) protocol, in which VCs are reserved in accordance with a request, but only for the duration of a call. Note that FIG. 11 also applies to the flow of RM cells in an FRM protocol. In response to a request from terminal $3_1$ for a bandwidth change, source-side subscriber switch 20 indexes route performance table 24 of routes to which the VC in question belongs, and looks for example at the residual bandwidth. This "residual bandwidth" may in fact be information relating to the link with the smallest residual bandwidth on those routes. Protocol controller 21 estimates residual bandwidth, etc. on the basis of this utilization ratio, and replies to terminal $3_1$, granting the change in bandwidth, etc.

As shown in FIG. 11, terminal $3_1$, outputs a request for a call bandwidth of 10 Mb/s to subscriber switch 20. Subscriber switch 20 then indexes route performance table 24 in protocol controller 21, examines the routes and their utilization ratios, and rapidly sends an answer back to terminal $3_1$. Consequently, if this invention is used the time taken from REQUEST to OK can be shortened.

A source-side subscriber switch can become aware of a congestion situation and can perform suitable route selection if, when congestion has occurred in a route pertaining to its destination-side subscriber switch or to one of its transit switches, the destination-side subscriber switch or transit switch outputs, to each route, cells bearing route information that includes information relating to that congestion.

A fourteenth embodiment of this invention will be explained with reference to FIG. 15, which shows the overall configuration of a variable-bandwidth network according to this fourteenth embodiment and applies also to the fifth embodiment. This fourteenth embodiment of the invention comprises: transmission links $7_1$–$7_3$ which constitute the transmission path that performs the ATM information transfer; transit switches 4, and $4_2$ disposed on this transmission path; terminal $3_1$ which transmits information at a cell output rate that has been set variably in accordance with the bandwidth utilization of the transmission path; terminal $3_2$ which receives said information; and subscriber switches 20 and 30 which respectively serve terminals $3_1$ and $3_2$ and connect them to the transmission path. Subscriber switch 20 has residual bandwidth table 101 (in FIG. 15, this is shown outside subscriber switch 20). This table stores information relating to the bandwidth utilization of the transmission path, the information being continually obtained by the subscriber switch 20. Subscriber switch 20 can also use RM cells to notify terminal $3_1$ which it serves of congestion information.

Figure 33:
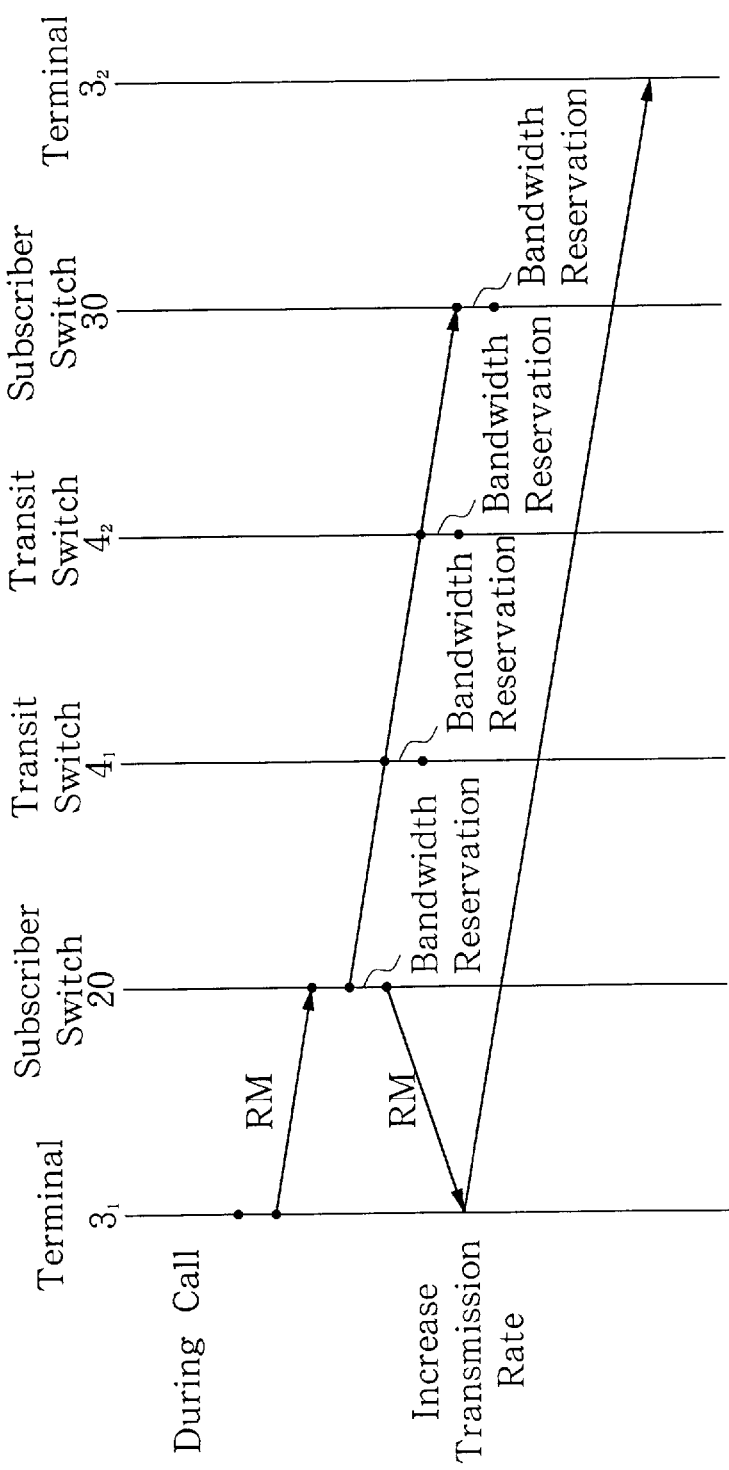
FIG. 33 is a normal operation timing chart according to a fourteenth embodiment of this invention.
Figure 34:
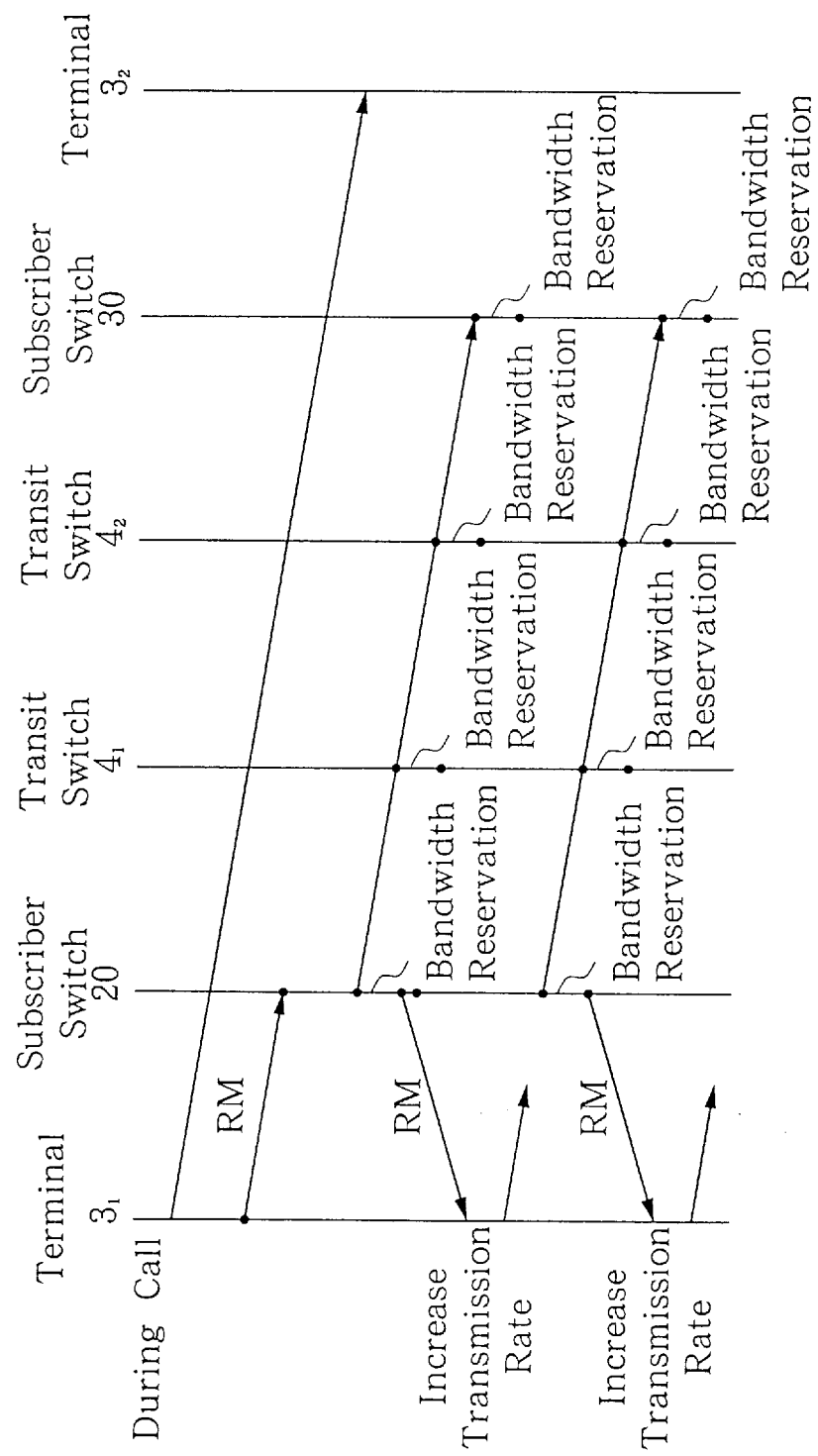
FIG. 34 is the operation timing chart when the utilized bandwidth is increased.
Figure 35:
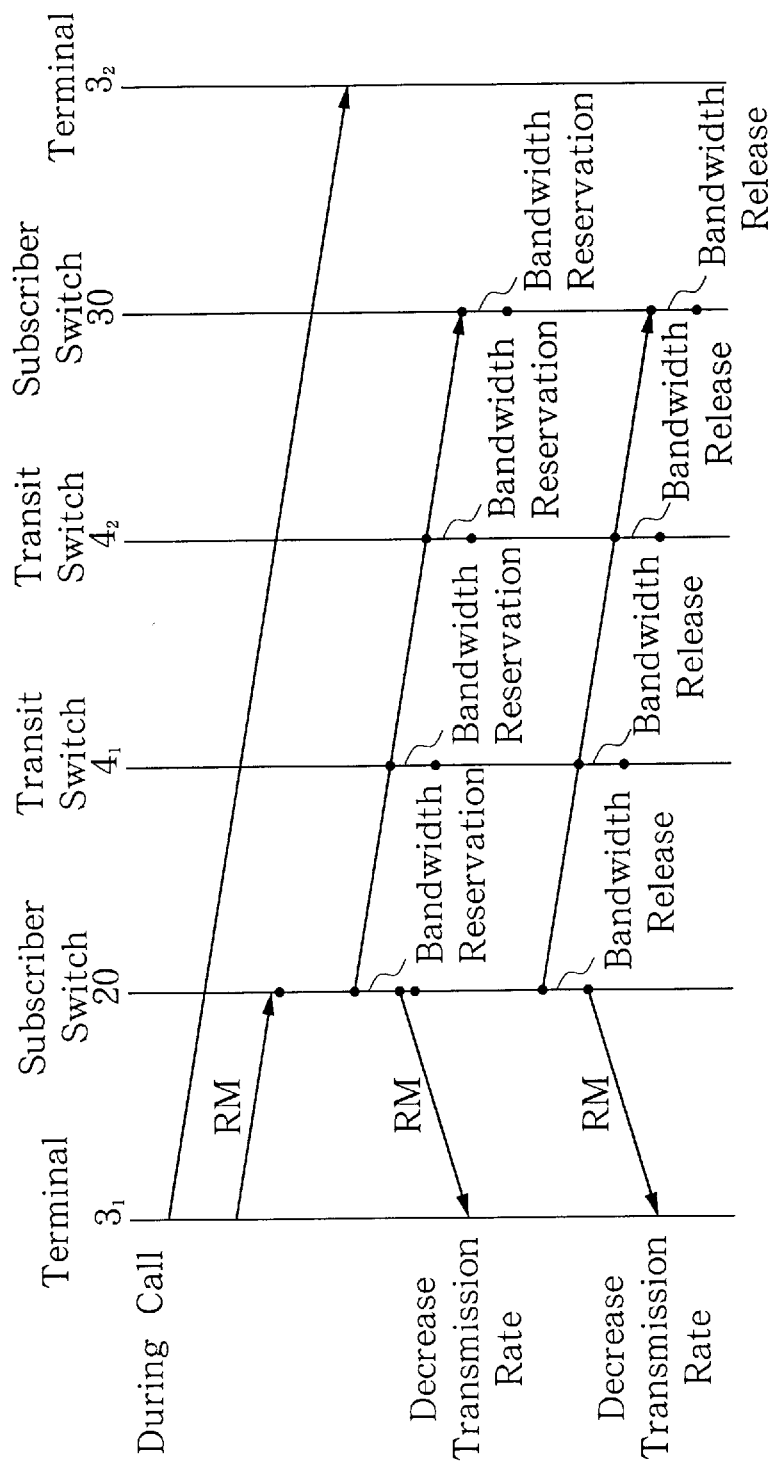
FIG. 35 is an operation timing chart when the utilized bandwidth is decreased.

FIG. 33 is the timing chart for normal operation of this fourteenth embodiment. FIG. 34 is the operation timing chart for when the utilized bandwidth is increased, and FIG. 35 is the operation timing chart for when the utilized bandwidth is decreased. The operation of this fourteenth embodiment of the invention will be explained with reference to FIG. 33–FIG. 35.

Subscriber switch 20 may for example periodically output OAM cells, use these to measure the available bandwidth of the transmission path comprising transmission links $7_1$, $7_2$ and $7_3$, and on this basis update residual bandwidth table 101. In FIG. 15 there is shown by way of example a residual bandwidth of 20 Mb/s entered in residual bandwidth table 101 for the connection with VCI "5". Instead of using residual bandwidth table 101, information relating to residual bandwidth can be managed by observing the cell output rate from source-side terminal $3_1$. It is also possible to use a combination of both methods.

At the beginning of a call, as shown in FIG. 33, terminal $3_1$ outputs RM cells in accordance with the same procedure as in the prior art. Subscriber switch 20 compares these RM cells with residual bandwidth table 101, writes information to the CI bit and the ER field in the RM cells, and returns them to terminal $3_1$. Subscriber switch 20 also transmits RM cells for reserving the required bandwidth to terminal $3_2$; and subscriber switch 20, transit switches $4_1$ and $4_2$ and subscriber switch 30 all secure this bandwidth. As a result, after cell transmission from terminal $3_1$ to terminal $3_2$ has begun, terminal $3_1$ outputs RM cells periodically in accordance with the same procedure as in the prior art, and subscriber switch 20 compares these RM cells with residual bandwidth table 101 and returns the RM cells after having rewritten their CI bit and ER field. As a result, the bandwidth utilized by terminal $3_1$ is controlled.

When it is necessary to increase the utilized bandwidth, then, as shown in FIG. 34, not only is the utilized bandwidth of terminal $3_1$ increased by the usual procedure of sending RM cells that have come from terminal $3_1$ back to this terminal from subscriber switch 20, but also, when there is sufficient residual capacity, new RM cells are generated by subscriber switch 20 and are transmitted to terminal $3_1$. Requests for increase or decrease in cell output rate, the allowed cell rate, and congestion information are written in these RM cells. This enables the bandwidth utilized by terminal $3_1$ to be increased rapidly.

When it is necessary to decrease the utilized bandwidth, then, as shown in FIG. 35, not only is the utilized bandwidth of terminal $3_1$ decreased by the usual procedure, but when for example the network is in a congested state, new RM cells are generated by subscriber switch 20 and are transmitted to terminal $3_1$. This enables the bandwidth utilized by terminal $3_1$ to be decreased rapidly.

Figure 36:
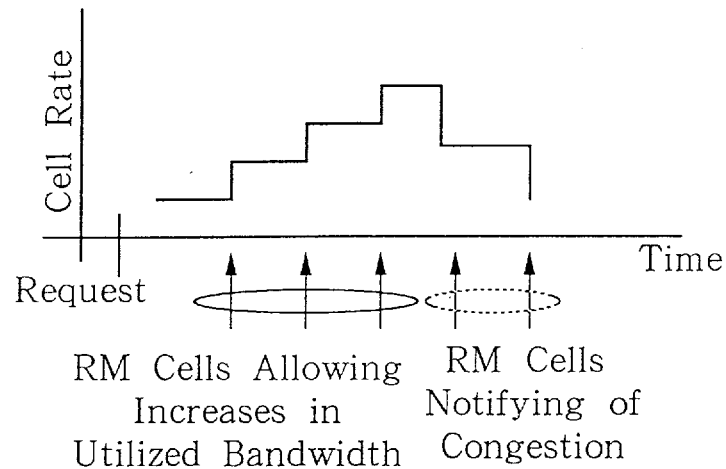
FIG. 36 shows in simplified form an example of increasing and decreasing the cell rate according to the prior art.
Figure 37:
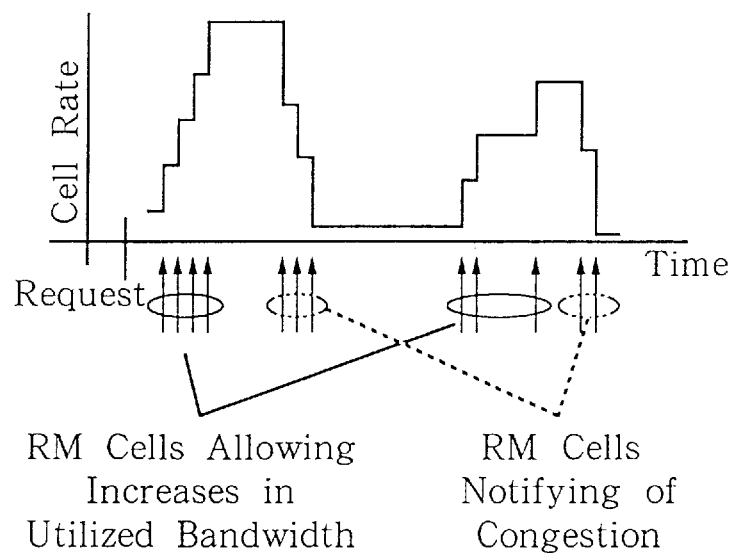
FIG. 37 shows in simplified form an example of changing the cell rate according to this invention.

FIG. 36 and FIG. 37 present in simplified form a comparison between the way in which cell output rate is increased and decreased according to the prior art, and according to the present invention, with FIG. 36 showing the prior art and FIG. 37 showing the present invention. In the prior art, a longer time is taken to actually grant a request for an increase in cell rate, and the response when congestion occurs is slow, whereas with the present invention both cell rate and traffic flow in the transmission path can be controlled rapidly.

Figure 38:
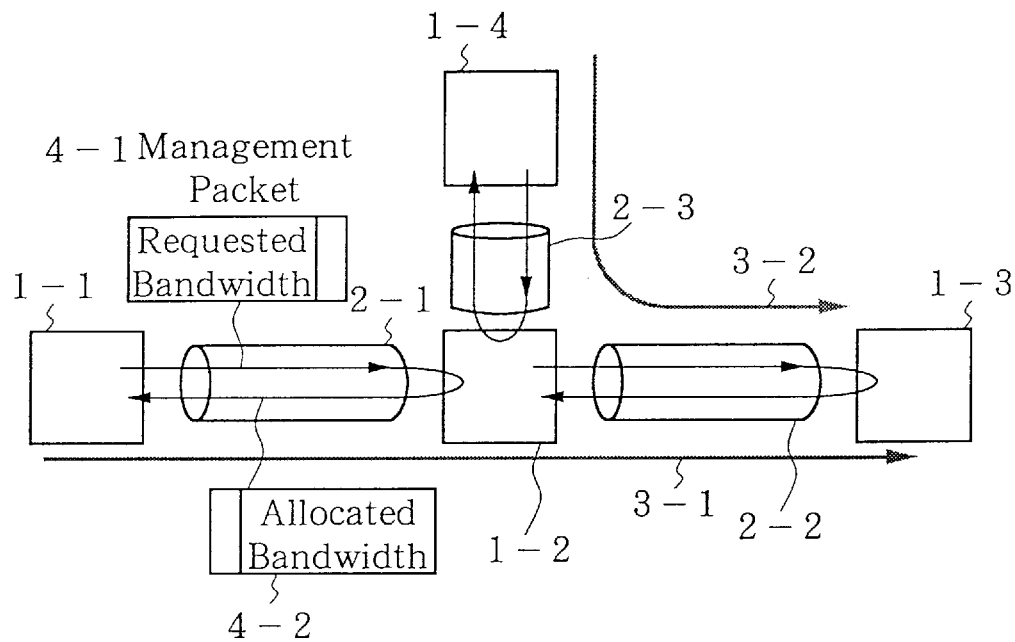
FIG. 38 shows the overall configuration of an ATM network according to a fifteenth embodiment of this invention.
Figure 39:
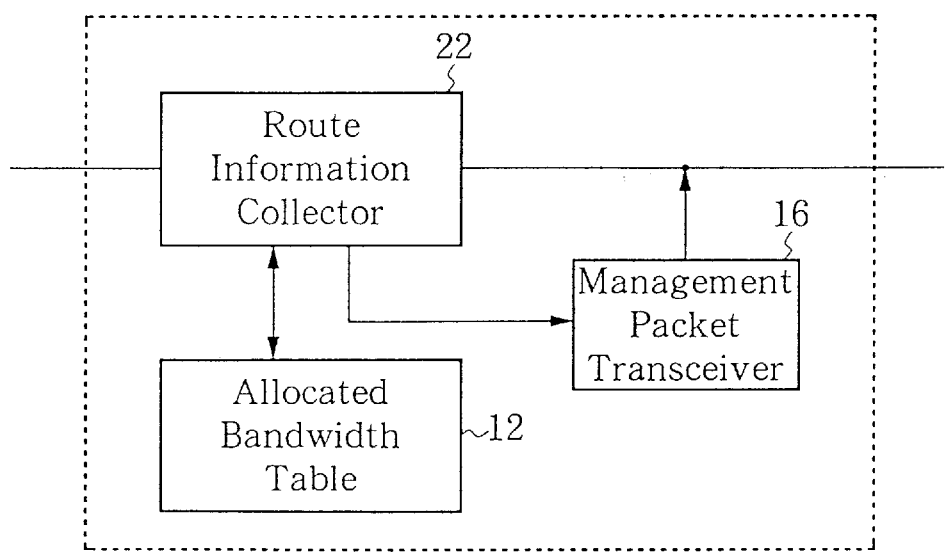
FIG. 39 is a block diagram of the essential parts of a source-side switch.
Figure 40:
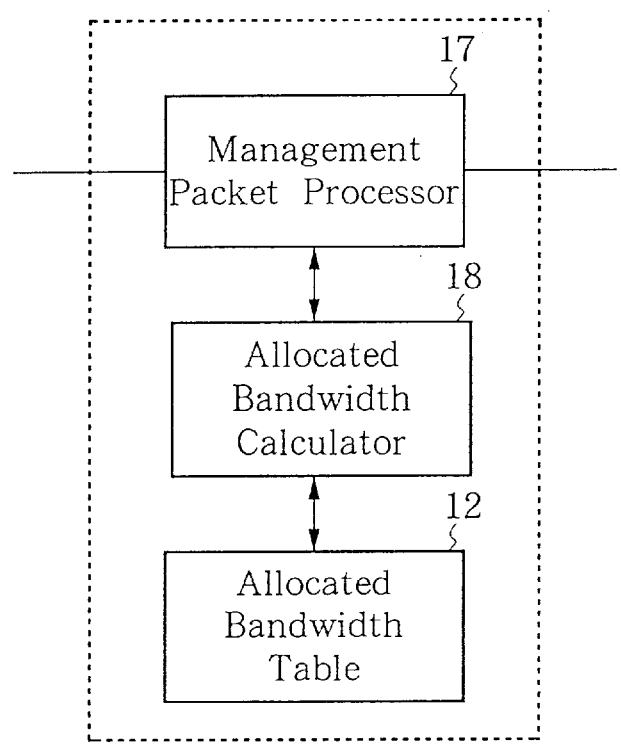
FIG. 40 is a block diagram of the essential parts of a destination-side switch or a transit switch.

The configuration of a fifteenth embodiment of this invention will be explained with reference to FIG. 38–FIG. 40. FIG. 38 shows the overall configuration of a variable-bandwidth network according to this fifteenth embodiment. FIG. 39 is a block diagram of the essential parts of a source-side switch. FIG. 40 is a block diagram of the essential parts of a destination-side or transit switch.

This fifteenth embodiment of the invention is a variable-bandwidth network comprising switches 1-1, 1-2, 1-3 and 1-4, and physical transmission paths connecting these switches, wherein variable-bandwidth VP 2-1 and VP 2-2 are set from source-side switch 1-1 to destination-side switch 1-3 by way of these physical transmission paths.

One feature of this embodiment of the invention is that switches 1-1 to 1-4 each have allocated bandwidth table 12 in which is recorded information relating to the allocated bandwidth (Bi, where i=1, ..., n) of routes pertaining to the switch in question, or of partial paths comprising VPs on those routes. Another feature of this embodiment is that allocated bandwidth calculator 18 comprises: means for calculating the allocable bandwidth by referring to the aforesaid table when there has been a setup request for a requested bandwidth (Ri) on a route (the $i^{th}$ route) pertaining to the switch in question, or on a partial path comprising a VP on that route; means for reserving the result of this calculation in said table; and means which sets this reserved value as the new allocated bandwidth of the route in question (the $i^{th}$ route) or of the partial path comprising a VP on that route.

FIG. 38 shows the overall configuration of an ATM network according to this fifteenth embodiment of the invention. In this fifteenth embodiment, each of switches 1-1, 1-2 and 1-4 is a source-side switch, and switch 1-3 is a destination-side switch. Switch 1-2 can function as both a source-side switch and a destination-side switch.

As shown in FIG. 39, each of switches 1-1, 1-2 and 1-4 comprises: management packet transceiver 16 as means for outputting management packet 4-1 preloaded with the aforesaid requested bandwidth (R) to the VP which it is desired to set up, the management packet 4-1 being output prior to use of that VP, the management packet transceiver 16 also serving as means for recovering this management packet 4-1 after it has passed through the VP which it is desired to set up; plus route information collector 22 as means for recognizing from that recovered management packet 4-1 the new allocated bandwidth for the VP which it is desired to set up. Moreover, as shown in FIG. 40, switch 1-2 and 1-3 both comprise management packet processor 17 which, when the management packet 4-1 arrives, gives the aforesaid requested bandwidth (R) which has been loaded into said management packet 4-1 in switches 1-2, 1-3 and 1-4, to allocated bandwidth calculator 18 as the requested bandwidth (Ri) of the VP in question (the $i^{th}$ VP).

Allocated bandwidth calculator 18 also includes means which compares the aforesaid requested bandwidth (R)

carried in arrived management packet 4-1 with the new allocated bandwidth calculated by allocated bandwidth calculator 18, and which reserves the smaller of these in allocated bandwidth table 12 of switches 1-2, 1-3 and 1-4. Management packet processor 17 has means for outputting management packet 4-1 after replacing the aforesaid requested bandwidth (R) with the new allocated bandwidth that has been reserved in said allocated bandwidth table 12.

Figure 41:
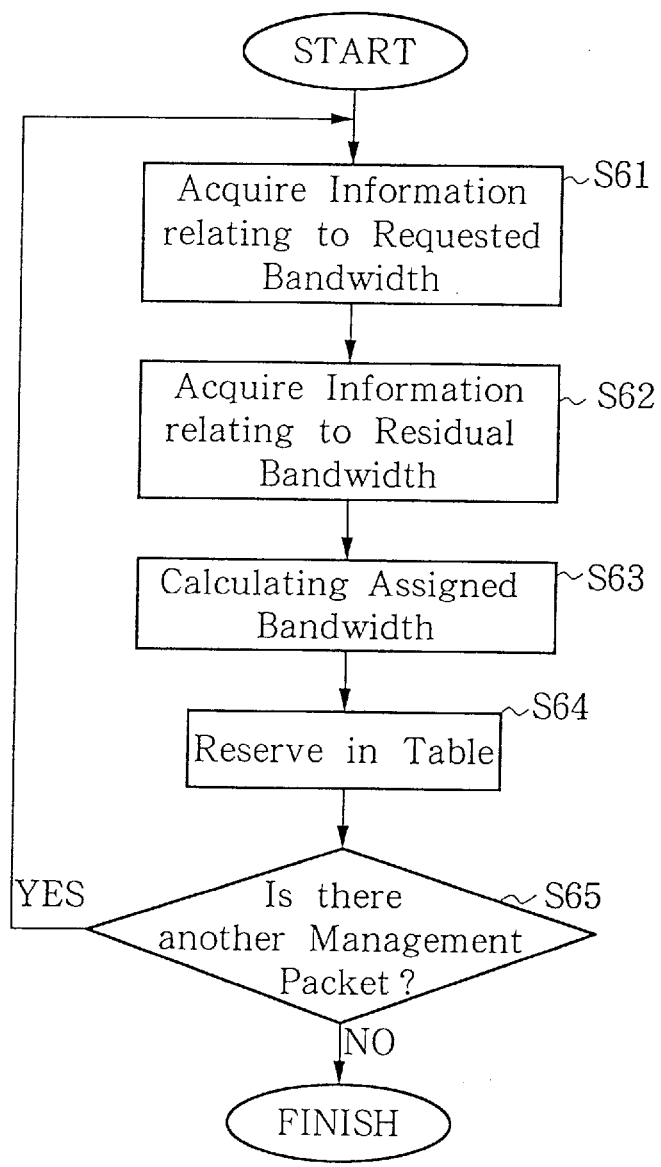
FIG. 41 is a flowchart showing the operation of the allocated bandwidth calculator.

The operation of allocated bandwidth calculator 18 will be explained with reference to FIG. 41, which is a flowchart showing said operation. Information relating to the requested bandwidth, which has been written to management packet 4-1, is acquired from management packet processor 17 (S61). Information relating to the residual bandwidth is acquired from allocated bandwidth table 12 (S62). The allocated bandwidth is calculated in accordance with the requested bandwidth information and the residual bandwidth information (S63). The result of this calculation is reserved in allocated bandwidth table 12 (S64), and is also written to management packet 4-1. If there is another management packet 4-1 (S65), the foregoing procedures are repeated.

Figure 42:
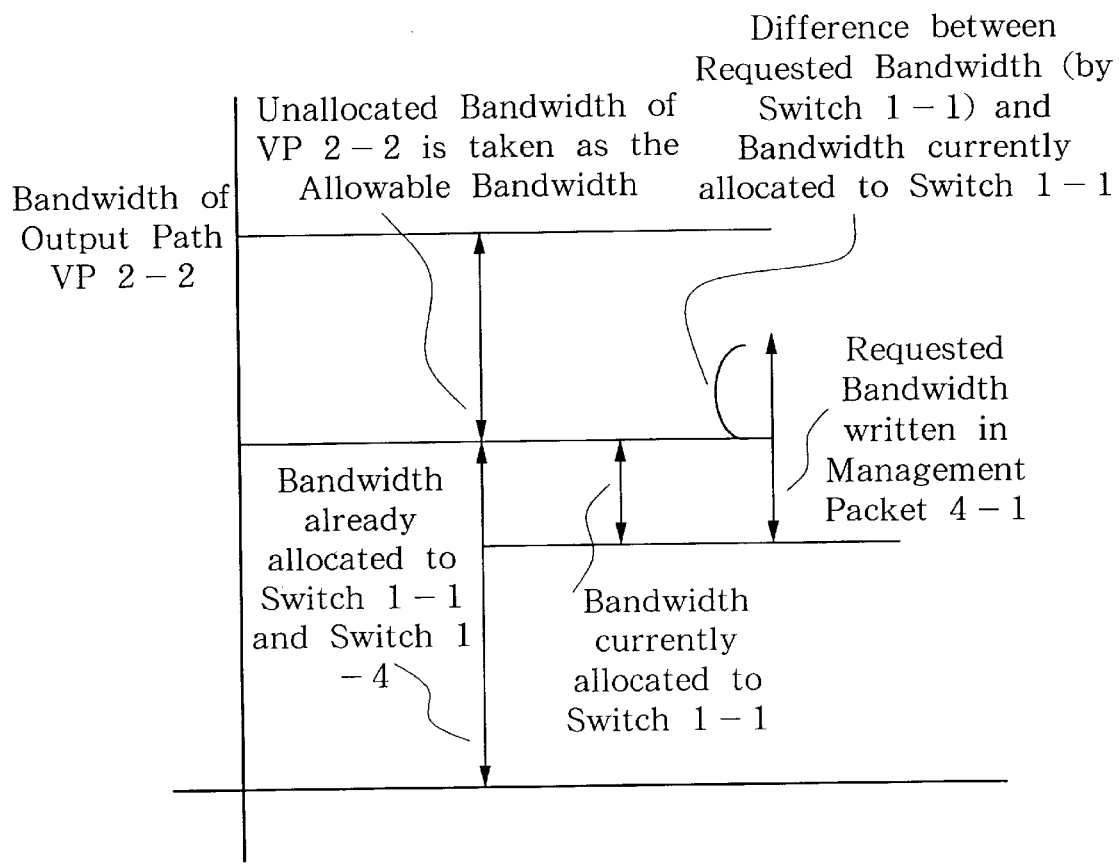
FIG. 42 shows the numerical relationships used to determine the allocated bandwidth regarding which switches are notified when a management packet is received.

The explanation of this fifteenth embodiment of the invention will take as an example the case where switch 1-1 receives a request for bandwidth allocation for the purpose of calling switch 1-3 via VP 2-1 and VP 2-2. Source-side switch 1-1 employs management packet transceiver 16 to generate, at regular intervals, management packets 4-1, writes the requested bandwidth in these packets, and transmits them to destination-side switch 1-3. Switch 1-2 stores and manages the unallocated bandwidth of VP 2-2 and the bandwidth allocated to switches 1-1 and 1-4. FIG. 42 shows the numerical relations which switch 1-2 uses to determine the allocated bandwidth which it notifies to switch 1-1 when it has received management packet 4-1.

As shown in FIG. 42, when switch 1-2 receives management packet 4-1, it takes the unallocated bandwidth of VP 2-2 as the allowable bandwidth and calculates the difference between the requested bandwidth and the bandwidth currently allocated to switch 1-1. If this difference is less than the unallocated bandwidth, it sets the allocated bandwidth to the value of the requested bandwidth. However, if the difference is not less than the unallocated bandwidth, switch 1-2 takes a value which is less than the current unallocated bandwidth as the allocated bandwidth, writes this to the management packet and transmits this packet back to switch 1-1.

After switch 1-1 has received returned management packet 4-2, it obtains new allocated bandwidth information from the allocated bandwidth written in this management packet 4-2. Source-side switches 1-1 and 1-4 can obtain information relating to the allocated bandwidth on various routes by performing similar operations in sequence on other switches. In this fifteenth embodiment of the invention, each switch 1-1 to 1-4 calculates allocated bandwidths and can notify source-side switch 1-1 of the allocated bandwidth for each route. Sending and receiving of management packets is carried out periodically, or every time there is a call.

Figure 43:
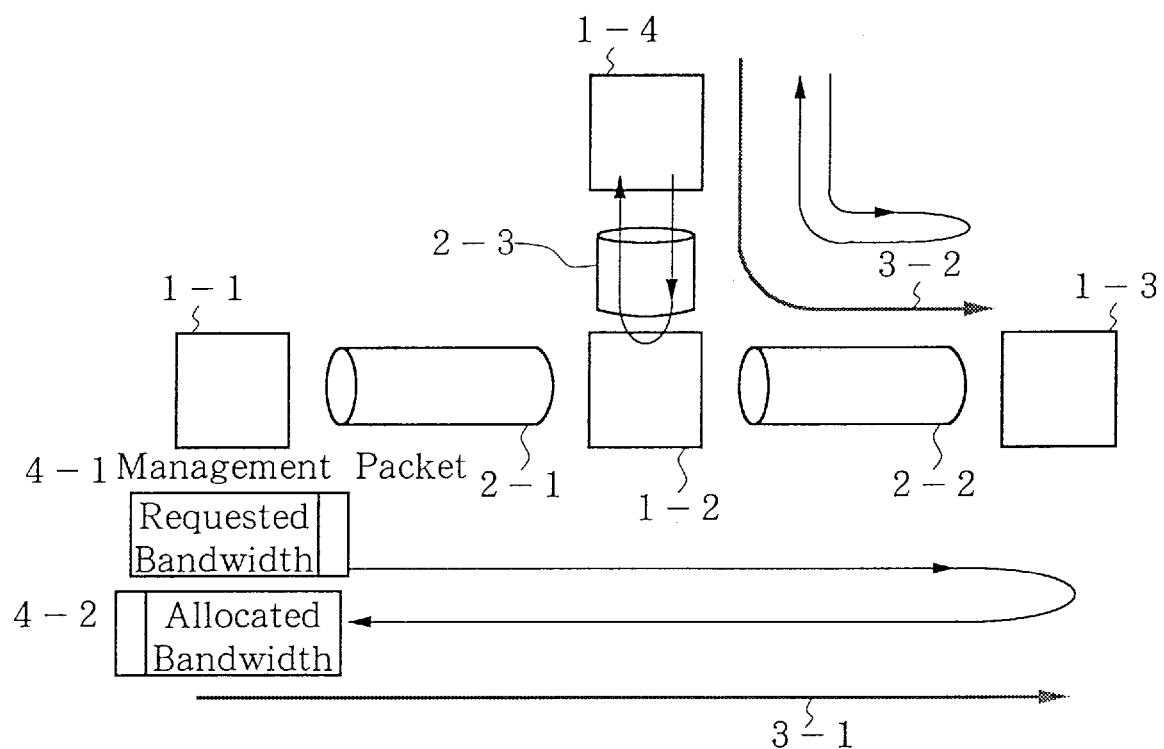
FIG. 43 serves to explain a sixteenth embodiment of this invention.

A sixteenth embodiment of this invention will be explained with reference to FIG. 43. In the sixteenth embodiment, switches 1-1 and 1-4 are source-side switches, switch 1-3 is a destination-side switch, and switch 1-2 is a transit switch. Source-side switches 1-1 and 1-4 have the configuration shown in FIG. 39, and destination-side switch 1-3 and transit switch 1-2 have the configuration shown in FIG. 40.

Figure 44:
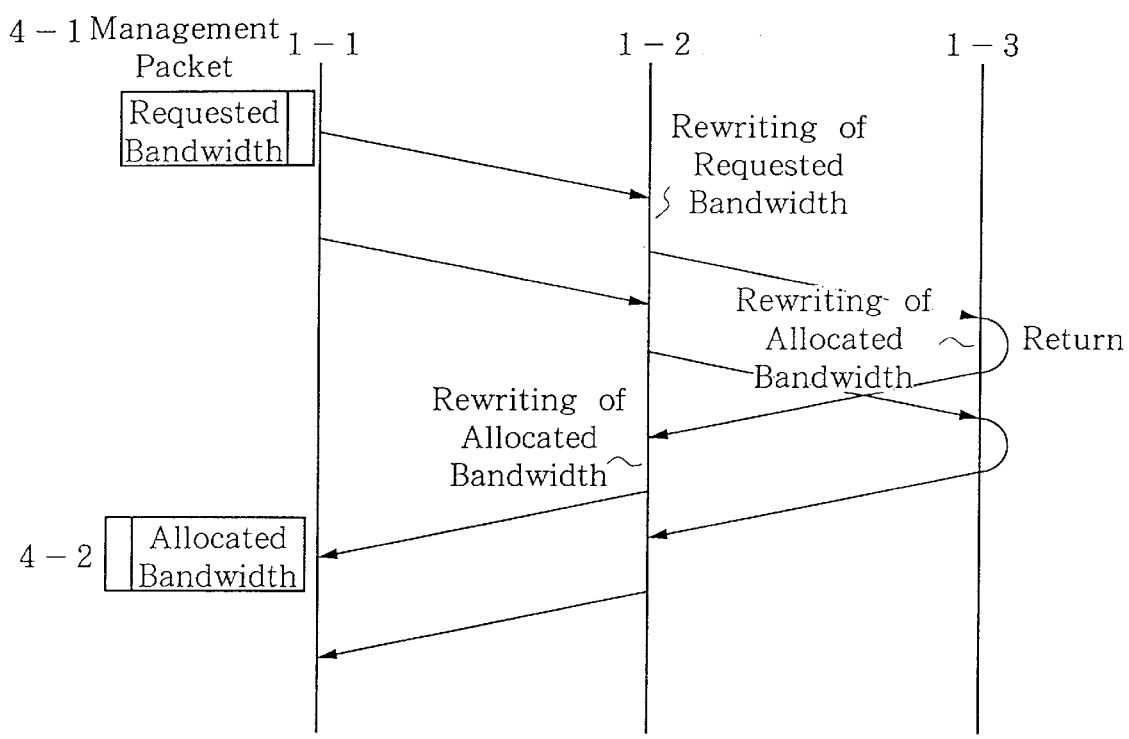
FIG. 44 is a timing chart showing the operation of a management packet.

An explanation will be given, by way of an example, of the case where switch 1-1 calls switch 1-3 via route 3-1 comprising VP 2-1 and VP 2-2. FIG. 44 is a timing chart showing how management packets 4-1 are used in route 3-1 of FIG. 43. Source-side switch 1-1 generates a management packet 4-1 at regular intervals, writes the requested bandwidth in it, and transmits it to destination-side switch 1-3.

Each switch 1-1 to 1-4 stores and manages the unallocated bandwidth of its output paths and the allocated bandwidth of each route it serves. As shown in FIG. 42, switch 1-2 takes the unallocated bandwidth of output path VP 2-2 as the allowable bandwidth, reads the requested bandwidth from the received management packet 4-1, calculates the difference between the requested bandwidth and the bandwidth currently allocated to the route, and if this difference is less than the unallocated bandwidth, sets the allocated bandwidth to the value of the requested bandwidth. However, if the difference is not less than the unallocated bandwidth, switch 1-2 takes a value which is less than the current unallocated bandwidth as the allocated bandwidth, rewrites the requested bandwidth in management packet 4-1 as the value of the allocated bandwidth, and transfers the management packet to switch 1-3.

Switch 1-3 writes the value of the allocated bandwidth that it has calculated in the same manner as switch 1-2, and transmits management packet 4-2 back to switch 1-1. After switch 1-2 has received this returned management packet 4-2, if the newest allocated bandwidth calculated in respect of route 3-1 is smaller than the allocated bandwidth written in management packet 4-2, switch 1-2 rewrites the allocated bandwidth and relays the management packet to switch 1-1. Switch 1-1 obtains information relating to the allocated bandwidth from the received management packet 4-2. In this sixteenth embodiment of the invention, each switch 1-1 to 1-4 calculates allocated bandwidths and can notify source-side switch 1-1 of the allocated bandwidth of each route. Sending and receiving of management packets is carried out periodically, or every time there is a call.

Figure 45:
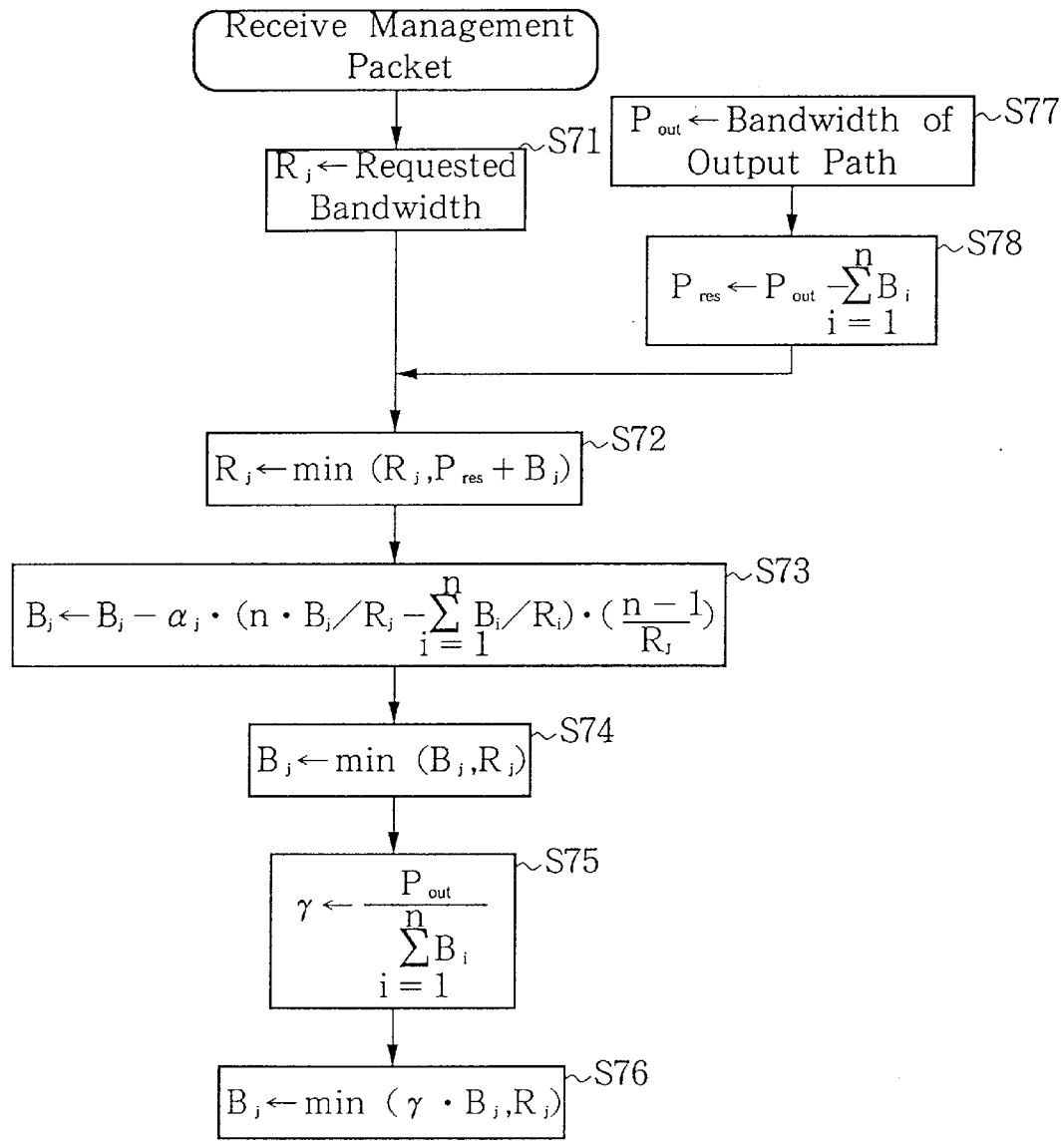
FIG. 45 is a flowchart showing the bandwidth allocation procedure according to a seventeenth embodiment of this invention.
Figure 46:
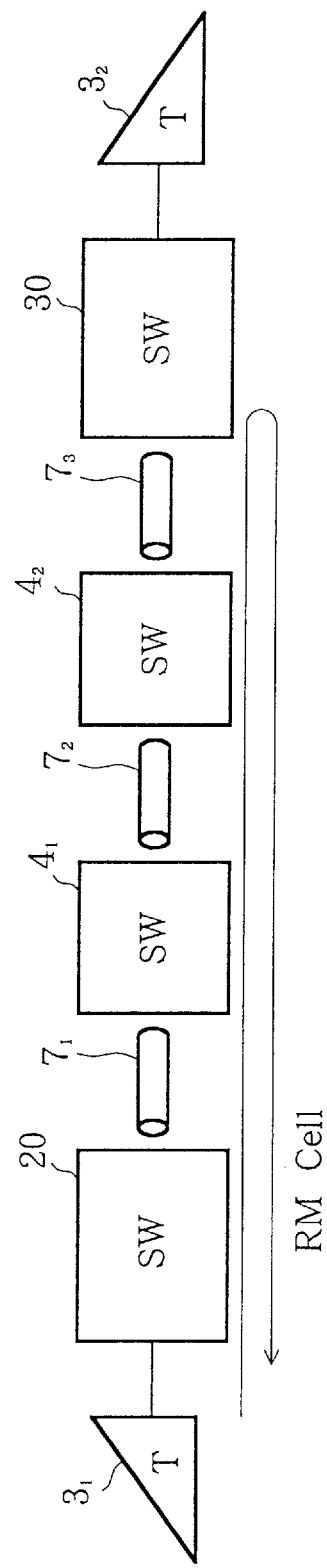
FIG. 46 is a block diagram showing a prior art variable-bandwidth network constituting an ATM network offering an ABR service.
Figure 48:
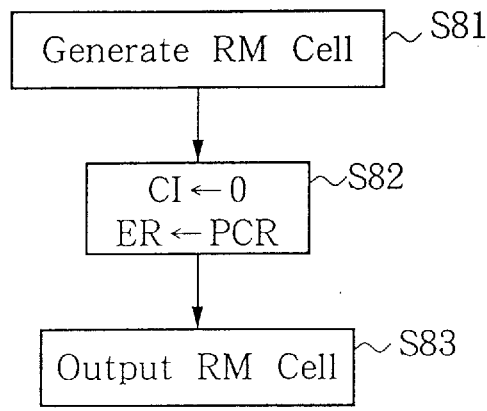
FIG. 48 shows the operation of a source-side terminal in relation to RM cells.
Figure 49:
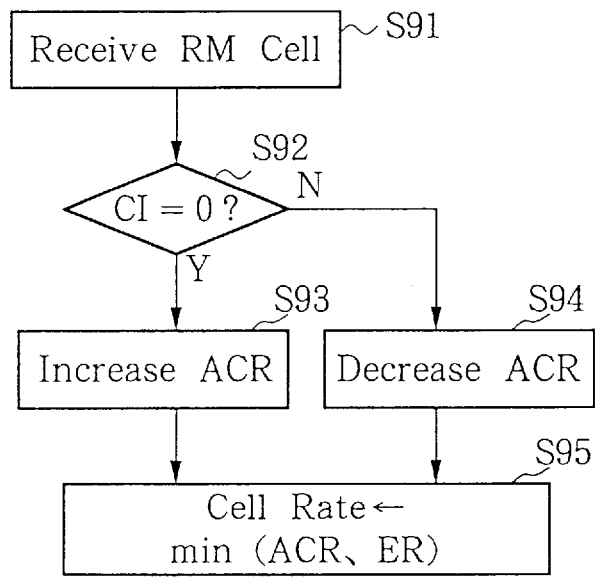
FIG. 49 shows the operation of a source-side terminal in relation to RM cells.
Figure 50:
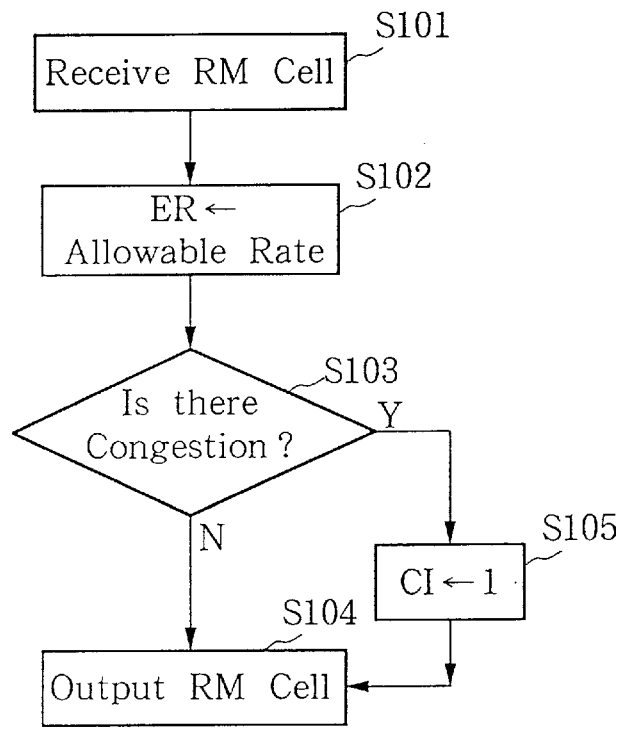
FIG. 50 shows the operation of a switch in relation to RM cells.
Figure 51:
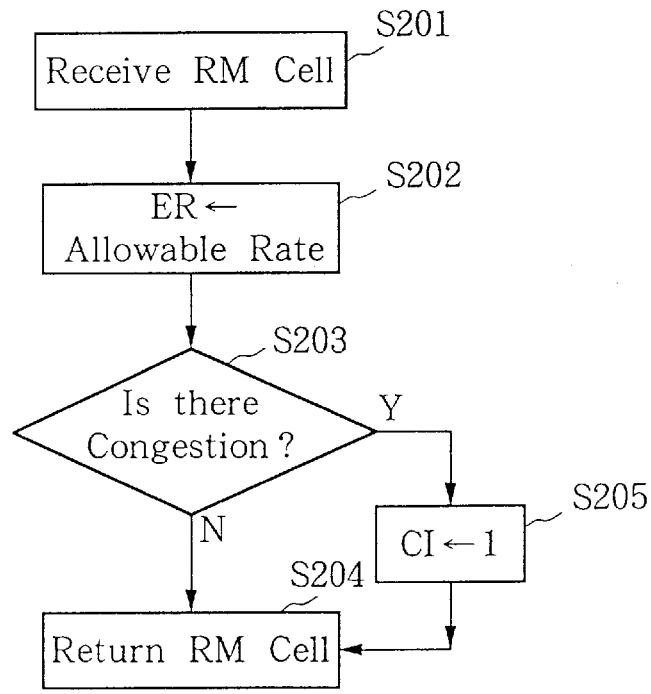
FIG. 51 shows the operation of a destination-side terminal in relation to RM cells.
Figure 52:
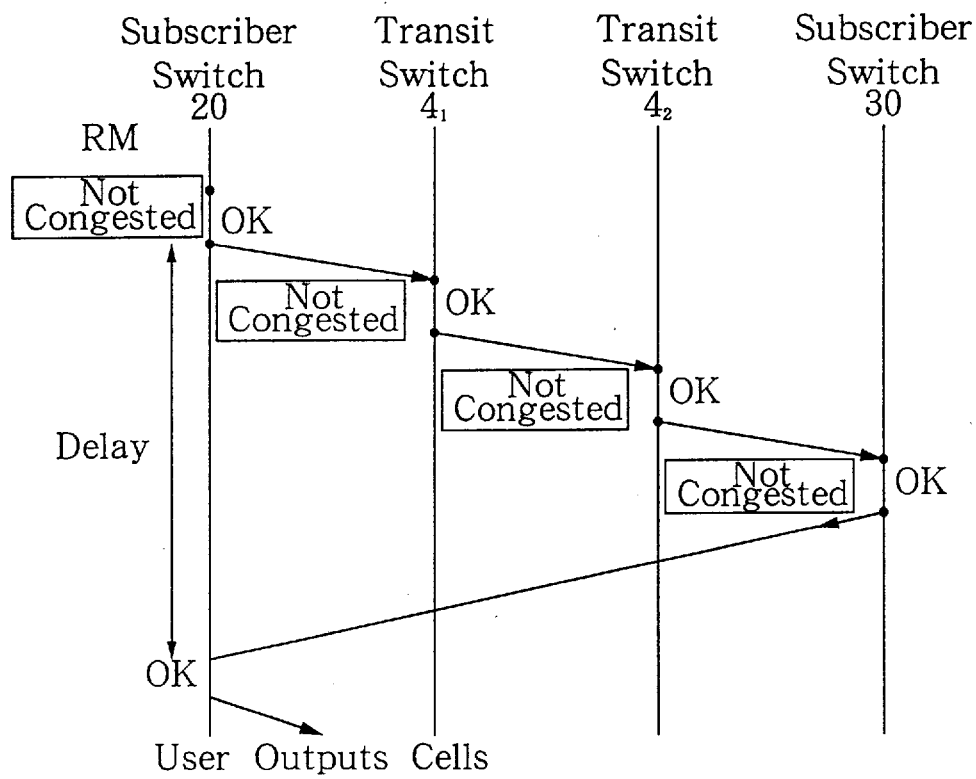
FIG. 52 shows a timing chart of the handling of RM cells at each switch.
Figure 53:
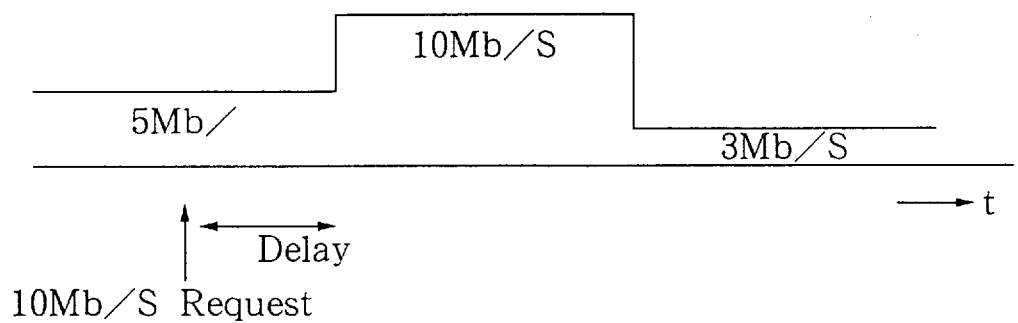
FIG. 53 shows an example of the temporal response to a request from a terminal.
Figure 54:
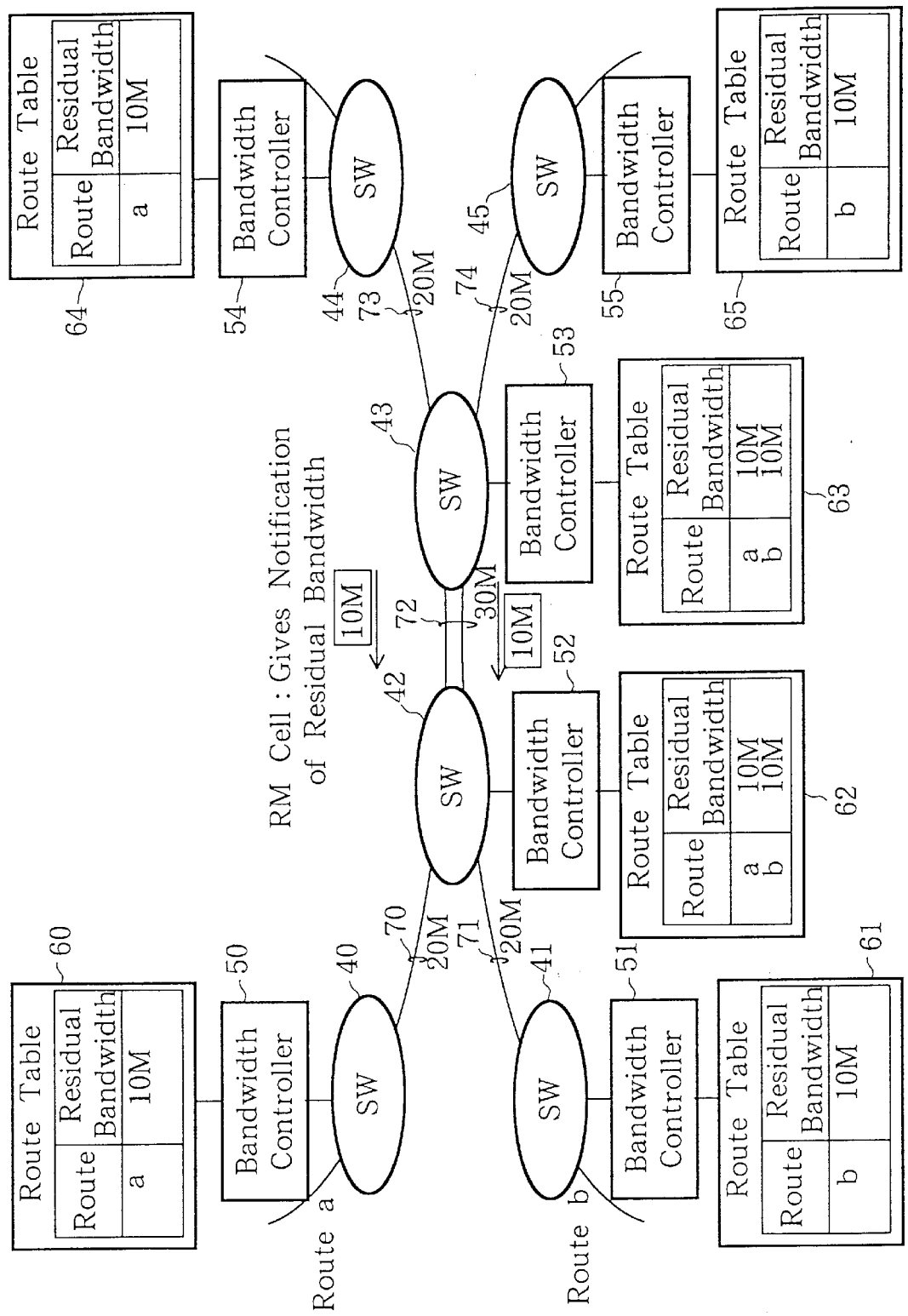
FIG. 54 is a block diagram showing a prior art variable-bandwidth network.

A seventeenth embodiment of this invention will be explained with reference to FIG. 45, which is a flowchart showing the bandwidth allocation procedure in this seventeenth embodiment. FIG. 45 assumes the same network configuration as in the fifteenth or sixteenth embodiments, and shows how the allocated bandwidth is calculated at each switch when a management packet is received. Namely, each switch holds information relating to the bandwidth of its output VP ($P_{out}$) (S77) and information relating to the total allocated bandwidth (i.e. the sum total of the allocated bandwidths Bi) of its output VP, and calculates the unallocated bandwidth of its output path ($P_{res}$) from this information (S78). Next, it calculates the sum of the unallocated bandwidth ($P_{res}$) and the bandwidth allocated to the input VP on which there was a request (Bj), and updates (Rj) to whichever of Rj or this sum is the smaller (S72).

When any switch 1-1 to 1-4 receives a management packet 4-1, it reads the requested bandwidth (S71) and sets the requested bandwidth (Rj) on the basis of the input VP (j) on which there has been a request (S72).

Next, the value of Bj is updated using the following formula (S73):

$$Bj \leftarrow Bj - \alpha j \cdot (n \cdot (Bj/Rj) - {}_{i=1 \text{ to } n}\Sigma(Bi/Ri)) \cdot ((n-1)/Rj)$$

where n, Bj and Rj respectively indicate the number of input VPs which use the same output VP, the allocated bandwidth of each input VP, and the requested bandwidth. $P_{out}$ is the total bandwidth of the output VP, $\alpha j$ is a parameter for adjusting the size of the increase or decrease, and γ is a function of $P_{out}$ and the bandwidth already allocated.

Next, the switch updates Bj to whichever of Bj or Rj is the smaller (S74). Next, it calculates the variable γ using the following formula (S75):

$\gamma \leftarrow P_{out}/_{i=1 \text{ to } n} \Sigma B_i$ updates Bj to whichever of Rj and the product of Bj and γ is the smaller, and takes the value of this Bj as the allocated bandwidth (S76).

According to this seventeenth embodiment of the invention, when any switch 1-1 to 1-4 calculates the allocated bandwidth, the proportion of allocated bandwidth to requested bandwidth for each route is averaged and the allocation is carried out dynamically and in real time so as to satisfy, as far as possible, the requested bandwidth which was written in the management packet, provided that the allowable bandwidth is not exceeded.

In order to make the explanations of the first to the seventeenth embodiments of this invention easier to understand, the source-side subscriber switches and the destination-side subscriber switches have been discussed as if they had different configurations. In practice, however, a single type of switch combining the configurations of both a source-side subscriber switch and a destination-side subscriber switch can be configured. Alternatively, a single type of switch combining the respective configurations of a source-side subscriber switch, a destination-side subscriber switch and a transit switch, can be configured. Moreover, it should be understood by those skilled in the art that other changes, alternations and substitutions can be made herein without departing from the spirit and scope of the invention as defined by the appended claims.

We claim:

1. A variable-bandwidth network comprising:
a plurality of subscriber switches;
a plurality of physical transmission paths that connect said plurality of subscriber switches with each other; and
transit switches interposed among said plurality of physical transmission paths;
wherein routes are set among the plurality of subscriber switches;
the subscriber switches having means which supports protocols which provide adaptive flow control of the network;
a source-side subscriber switch comprises:
means for collecting route information that includes a residual bandwidth of a route that has been set between said source-side subscriber switch and a destination-side subscriber switch; and
means for performing the adaptive flow control in accordance with said route information.

2. A variable-bandwidth network as set forth in claim 1, wherein the means which collects said route information provided in a source-side subscriber switch includes means which outputs, to each said route, cells for collecting the route information of said route, and wherein the transit switches and subscriber switches have means which, when said cells have arrived, loads said information into a data field of said cells and forwards the cells in accordance with the routing information recorded in an address field of said cells.

3. A variable-bandwidth network as set forth in claim 1, the destination-side subscriber switch and the transit switches have means for addressing and sending cells to said source-side subscriber switch, said cells bearing route information relating to virtual paths (VPs) pertaining to said destination-side and transit switches.

4. A variable-bandwidth network as set forth in claim 1, further comprising a centralized controller; and
wherein the subscriber switches and transit switches have means for sending cells bearing the route information, said cells being addressed to said centralized controller; and
said centralized controller comprising means for reading and collecting the route information from said cells that have arrived, and means for notifying the source-side subscriber switch of the contents of said collecting means.

5. A variable-bandwidth network as set forth in claim 1, said further comprising sending means which, when congestion has occurred in a virtual transmission path (VP) pertaining to its subscriber switch or its transit switch, sends cells bearing route information that includes information relating to said congestion.

6. A variable-bandwidth network as set forth in claim 1, wherein source-side subscriber switch includes a residual bandwidth table which stores information relating to the bandwidth utilization of the routes, and means which, when there has been a bandwidth change request from a terminal served by said source-side subscriber switch, decides for or against the bandwidth change of said terminal by making a comparison with the residual bandwidth stored in the residual bandwidth table.

7. A variable-bandwidth network as set forth in claim 6, wherein the source-side subscriber switch includes means which monitors the minimum residual bandwidth on routes through which its connections pass, by periodically transferring operations and maintenance cells to the other of said plurality of subscriber switches connected via the routes.

8. A variable-bandwidth network as set forth in claim 6, wherein the means which decides for or against a bandwidth change includes means which considers that there are a plurality of bandwidth change requests in the same residual bandwidth measurement period, and which reserves a portion of the residual bandwidth of each route measured by a measuring means, said portion being reserved for other bandwidth change requests.

9. A variable-bandwidth network as set forth in claim 8, wherein the reserving means includes means whereby the residual bandwidth measured by the measuring means is multiplied by a preset safety factor for that route, and the result is taken as allocable residual bandwidth.

10. A variable-bandwidth network as set forth in claim 8, wherein the reserving means includes means whereby the residual bandwidth measured by the measuring means is multiplied by a safety factor determined by the intervals at which bandwidth change requests for that route have occurred up to the present time, and the result is taken as allocable residual bandwidth.

11. A variable-bandwidth network as set forth in claim 8, wherein the reserving means includes means which obtains allocable residual bandwidth on the basis of the changes to date in the residual bandwidth measured by the measuring means.

12. A variable-bandwidth network as set forth in claim 8, wherein the reserving means includes means which takes as allocable residual bandwidth the sum of (i) a value obtained by multiplying the residual bandwidth measured by the measuring means the previous time by a smoothing coefficient α, and (ii) a value obtained by multiplying the newly-measured residual bandwidth by 1−α.

13. A variable-bandwidth network as set forth in claim 1, wherein the source-side subscriber switch comprises means for collecting and recording new route information relating to a plurality of routes that can be set between said source-side subscriber switch and the destination-side subscriber switch, irrespective of whether there is a connection request; and
further comprising means which, when there is a connection request, selects a route on the basis of the recorded route information.

14. A variable-bandwidth network as set forth in claim 13, wherein the recording means includes means which sends to each route cells for collecting route information, and at least one of the transit switches and subscriber switches have means which, when these cells have arrived, loads route information into a data field of said cells and forwards the cells in accordance with the routing information recorded in an address field of said cells.

15. A variable-bandwidth network as set forth in claim 14, wherein the route information includes information relating to virtual paths (VPs) pertaining to the transit switches and subscriber switches, and the forwarding means forwards the cells after addressing them to the source-side subscriber switch.

16. A variable-bandwidth network as set forth in claim 13, wherein the route selecting means selects, from among the plurality of routes, and from among routes which have more residual bandwidth than the bandwidth requested by the user, the route with the least residual bandwidth or the route with the smallest residual bandwidth ratio.

17. A variable-bandwidth network as set forth in claim 13, wherein the route selecting means selects, from among the plurality of routes, and from among routes which have more residual bandwidth than a requested bandwidth, the route with the largest utilized bandwidth or the largest utilized bandwidth ratio.

18. A variable-bandwidth network as set forth in claim 13, further comprising a centralized controller is provided, and
wherein at least one of the subscriber switches and transit switches have means which outputs cells bearing route information and addressed to said centralized controller, and
the centralized controller comprises means which reads and collects route information from said cells when they have arrived, and means which notifies the source-side subscriber switch of the content collected by said reading and collecting means.

19. A variable-bandwidth network as set forth in claim 14, wherein, when congestion has occurred in a virtual path (VP) pertaining to at least one of said transit switches or subscriber switches in said virtual path, the means which outputs cells bearing route information and containing information relating to said congestion.

20. A variable-bandwidth network as set forth in claim 1, wherein at least one of said subscriber switches has means which communicates congestion information to terminals it serves, and said communicating means includes means which independently forms cells into which are written requests for an increased or decreased cell rate, an allowed cell rate, and congestion information, and which transmits said cells to the terminals served by its subscriber switch.

21. A variable-bandwidth network as set forth in claim 1, wherein each of the subscriber switches and transit switches comprises:
a table in which is recorded information relating to the allocated bandwidth (Bi, where i=1, ..., n) of routes pertaining to that switch, or of partial paths comprising virtual paths (VPs) on said pertaining routes;
means for calculating the allocable bandwidth by referring to said table when there has been a setup request for a requested bandwidth (Ri) on a given route (the $i^{th}$ route) pertaining to said switch, or for a partial path comprising a virtual path (VP) on said given route;
means for reserving the result of the calculation in said table; and
means which sets said reserved value as the new allocated bandwidth of the given route (the $i^{th}$ route) or of the partial path comprising a virtual path (VP) on the given route.

22. A variable-bandwidth network as set forth in claim 21, wherein the source-side subscriber switch has:
means which outputs a management packet already bearing the requested bandwidth to the route which is desired to set up, or to the partial path comprising a virtual path (VP) on said desired route, said management packet being output prior to the use of said desired route or partial path comprising a virtual path (VP) on said desired route, and said outputting means recovering said management packet after said management packet has passed through said desired route or through the partial path comprising a virtual Path (VP) on said desired route; and
means which recognizes, from said recovered management packet, the new allocated bandwidth for said desired route or for the partial path comprising a virtual path (VP) on said desired route;
wherein, when said management packet arrives at each of the subscriber switches and transit switches, the requested bandwidth (R) which was loaded into said management packet at said source-side subscriber switch is given to the calculating means as the requested bandwidth (Ri) of the given route (the $i^{th}$ route) or of a partial path comprising a virtual path (VP) on the given route.

23. A variable-bandwidth network as set forth in claim 22, wherein each of the subscriber switches and transit switches has:
means which compares the requested bandwidth (R) carried in the management packet which has arrived, and the new allocated bandwidth that was calculated by the calculating means, and which reserves the smaller of these in the table of the switch;
and means which forwards said management packet after substituting the new allocated bandwidth reserved in said table for the requested bandwidth (R).

24. A variable-bandwidth network as set forth in claim 21, wherein the calculating means includes means which averages the weighting of the allocated bandwidth relative to the requested bandwidth by minimizing the evaluation function:

$$F(B)=(1/n)\cdot_{i=1\ to\ n}\Sigma[(Bi/Ri)-(1/n)\cdot_{i=1\ to\ n}\Sigma[(Bj/Rj)]^2$$

where Bi is the allocated bandwidth, Ri is the requested bandwidth (i=1, 2, ..., n), and n is the number of routes multiplexed in an output virtual Path (VP).

25. An ATM network as set forth in claim 21, wherein the new allocated bandwidthBj is updated as follows:

$$Bj \leftarrow Bj - \alpha j \cdot (n \cdot (Bj/Rj) -_{i=1\ to\ n}\Sigma(Bi/Ri)) \cdot ((n-1)/Rj).$$

* * * * *